(12) United States Patent
Nishira et al.

(10) Patent No.: US 8,392,104 B2
(45) Date of Patent: Mar. 5, 2013

(54) AVOIDANCE MANEUVER CALCULATION DEVICE, AVOIDANCE CONTROL DEVICE, VEHICLE HAVING EACH DEVICE, AVOIDANCE MANEUVER CALCULATING METHOD, AND AVOIDANCE CONTROLLING METHOD

(75) Inventors: Hikaru Nishira, Machida (JP); Yoshitaka Deguchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 797 days.

(21) Appl. No.: 12/293,704

(22) PCT Filed: Mar. 19, 2007

(86) PCT No.: PCT/JP2007/055471
§ 371 (c)(1),
(2), (4) Date: Sep. 19, 2008

(87) PCT Pub. No.: WO2007/108429
PCT Pub. Date: Sep. 27, 2007

(65) Prior Publication Data
US 2010/0235035 A1    Sep. 16, 2010

(30) Foreign Application Priority Data
Mar. 22, 2006  (JP) .................................. 2006-079321

(51) Int. Cl.
G08G 1/16      (2006.01)
(52) U.S. Cl. ....... 701/301; 701/29.6; 701/116; 701/124; 180/280; 342/71; 348/119; 348/148

(58) Field of Classification Search ................... 701/23, 701/41, 43, 301; 180/421, 443, 280; 342/70, 342/71; 348/119, 148
See application file for complete search history.

(56) References Cited

U.S. PATENT DOCUMENTS

| 5,926,126 | A | 7/1999 | Engelman |
| 6,026,347 | A * | 2/2000 | Schuster ........................ 701/301 |
| 6,035,053 | A | 3/2000 | Yoshioka et al. |
| 6,338,022 | B1 * | 1/2002 | Shinmura et al. ............. 701/301 |
| 6,487,501 | B1 * | 11/2002 | Jeon .............................. 701/301 |
| 6,675,094 | B2 * | 1/2004 | Russell et al. ................. 701/301 |
| 7,085,633 | B2 | 8/2006 | Nishira et al. |

FOREIGN PATENT DOCUMENTS

| DE | 100 29 874 A1 | 1/2001 |
| JP | 2000-215396 A | 8/2000 |
| JP | 2001-001925 A | 1/2001 |
| JP | 2003-182552 A | 7/2003 |
| JP | 2004-114954 A | 4/2004 |
| JP | 2004-157910 A | 6/2004 |
| JP | 2004-171391 A | 6/2004 |

* cited by examiner

Primary Examiner — Thomas H. Tarcza
Assistant Examiner — Adam Tissot
(74) Attorney, Agent, or Firm — Foley & Lardner LLP

(57) ABSTRACT

Provided is an avoidance maneuver calculation device that calculates a driving maneuver amount that enables an automotive vehicle to avoid an obstacle within a travelable range of a road. The device includes: a road boundary detector for detecting a road 13 where a vehicle 12 is traveling and a boundary section thereof; an obstacle detector for detecting an obstacle 14 existing on the road 13; an automotive vehicle information detector for detecting information on the vehicle 12; and an avoidance maneuver calculator 28 for calculating a maneuver amount for avoiding the obstacle 14 on the road 13.

27 Claims, 21 Drawing Sheets

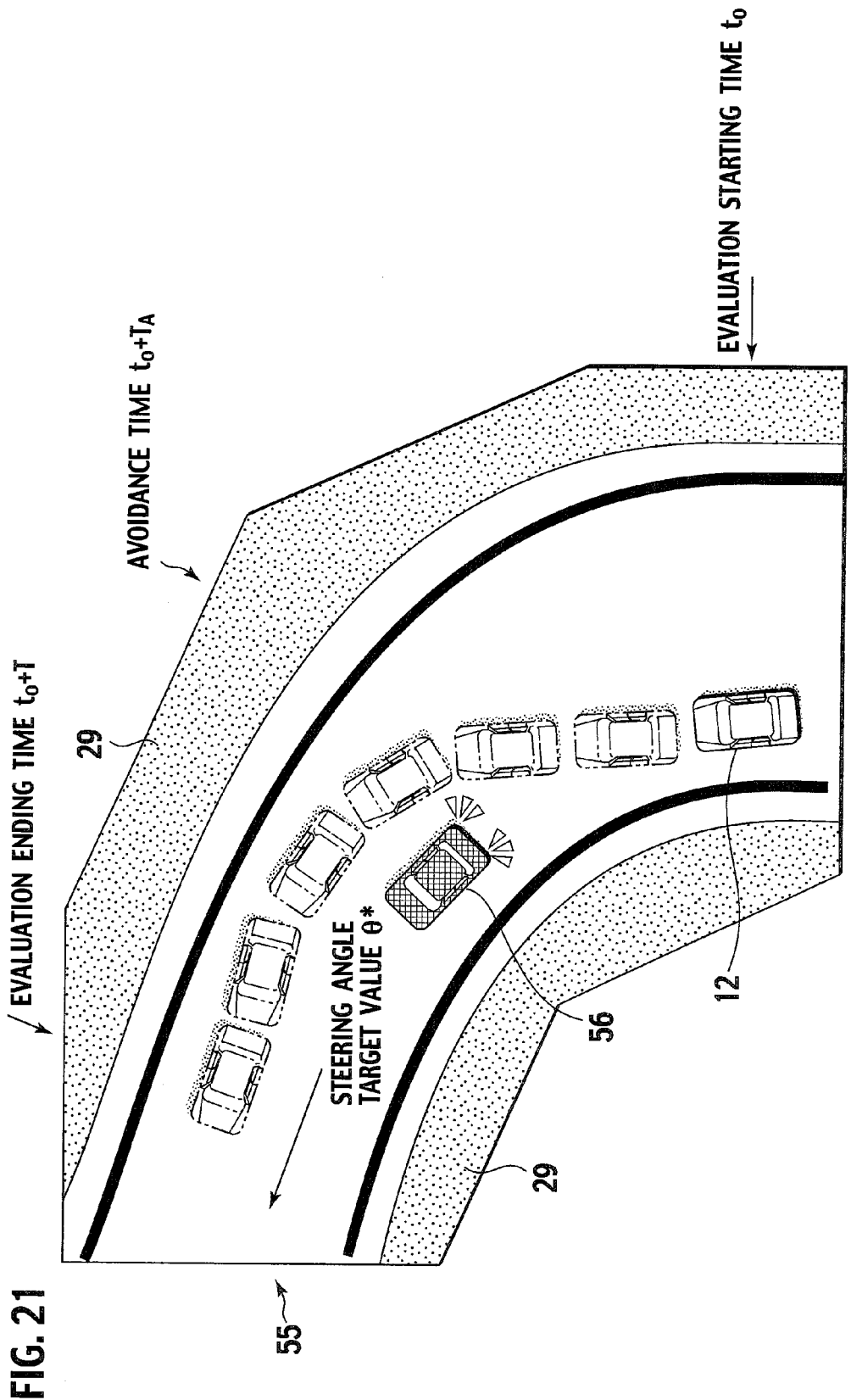

AVOIDANCE MANEUVER CALCULATION DEVICE, AVOIDANCE CONTROL DEVICE, VEHICLE HAVING EACH DEVICE, AVOIDANCE MANEUVER CALCULATING METHOD, AND AVOIDANCE CONTROLLING METHOD

TECHNICAL FIELD

The present invention relates to an avoidance maneuver calculation device, an avoidance control device, a vehicle having each device, an avoidance maneuver calculating method, and an avoidance controlling method for avoiding an obstacle on a road where an automotive vehicle is traveling.

BACKGROUND ART

A conventional traveling safety device is configured to detect an obstacle on a road where an automotive vehicle is traveling and to maneuver the automotive vehicle by driving an actuator for electric power steering upon detection of the obstacle. Thereby, the automotive vehicle avoids the obstacle. When trying to avoid an obstacle, this traveling safety device deflects a traveling direction of the automotive vehicle from a direction of the road, i.e. the direction along a track shape of the road. Accordingly, a driver needs to perform steering to bring the traveling direction of the automotive vehicle back to the direction of the road. This steering is burdensome to the driver. Moreover, the driver experiences a discomfort as the traveling direction of the automotive vehicle deviates from the direction of the road.

For this reason, JP-A 2001-1925 (pp. 2 to 18, FIG. 5) discloses a traveling safety device configured to perform the steering so as to align a traveling direction of an automotive vehicle with a direction of a road upon a judgment that an obstacle is avoided. This traveling safety device aligns the traveling direction of the automotive vehicle, which is deviated from the direction of the road, with the direction of the road again after the automotive vehicle avoids the obstacle. Accordingly, it is possible to reduce a burden and a discomfort for a driver, as compared to the case of only performing avoidance maneuver.

DISCLOSURE OF THE INVENTION

Problem to be Solved by the Invention

The above-described conventional traveling safety device performs the maneuver to avoid the obstacle in consideration of only the obstacle. However, there is generally a limitation for a range of the road width, i.e. a travelable range on the road. Therefore, when the traveling safety device performs the steering, the automotive vehicle may come too close to an edge of the road.

Accordingly, an object of the present invention is to provide an avoidance maneuver calculation device configured to calculate a driving maneuver amount that enables an automotive vehicle to avoid an obstacle within a travelable range on a road, an avoidance control device configured to execute driving maneuver, based on the driving maneuver amount calculated by this avoidance maneuver calculation device, a vehicle including each device, an avoidance maneuver calculating method, and an avoidance controlling method.

Means for Solving the Problem

To solve the above-described problem, an avoidance maneuver calculation device according to the present invention includes: a road boundary detector that detects a road located ahead of an automotive vehicle and on which the automotive vehicle is traveling and a boundary section thereof; an obstacle detector that detects an obstacle existing on the road ahead of the automotive vehicle; an automotive vehicle information detector that detects an attitude angle formed by a traveling direction of the automotive vehicle with respect to a direction of the road, a position of the automotive vehicle on the road, and a speed of the automotive vehicle; and an avoidance maneuver calculator that calculates an amount of maneuver for avoiding the obstacle on the road, based on detection information detected by the detectors.

Effects of the Invention

When calculating the maneuver amount for avoiding the obstacle, the avoidance maneuver calculation device according to the present invention calculates the maneuver amount in consideration of the boundary section of the road in addition to the obstacle. Specifically, the avoidance maneuver calculation device calculates the maneuver amount that enables the automotive vehicle to avoid the obstacle within a width of the road, i.e. within a travelable range. For this reason, even when fences are provided on both sides of the road, for example, it is possible to calculate the maneuver amount that enables the automotive vehicle to avoid the obstacle and to return to a track taken before the avoidance without coming too close to an end.

BRIEF DESCRIPTION OF THE DRAWINGS

FIG. 21 is a plan view showing a movement locus of avoidance of an obstacle for a vehicle, the avoidance executed by the avoidance control device of the third embodiment.

BEST MODES FOR CARRYING OUT THE INVENTION

The present invention will be described in detail along embodiments shown in FIGS. 1 to 21.

First Embodiment

Figure 1:
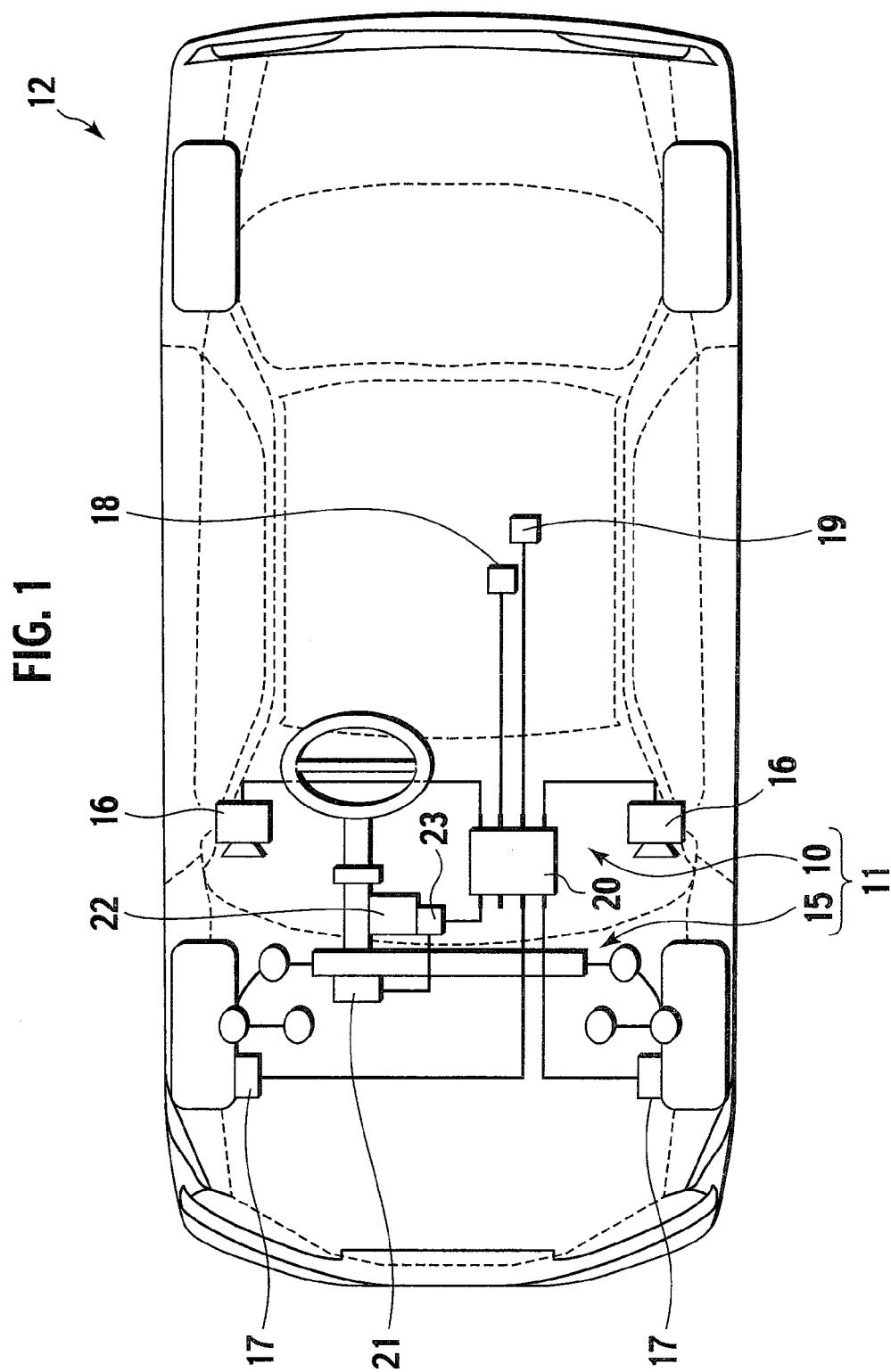
FIG. 1 is a plan view schematically showing a vehicle employing an avoidance maneuver calculation device and an avoidance control device, according to the embodiment.
Figure 2:
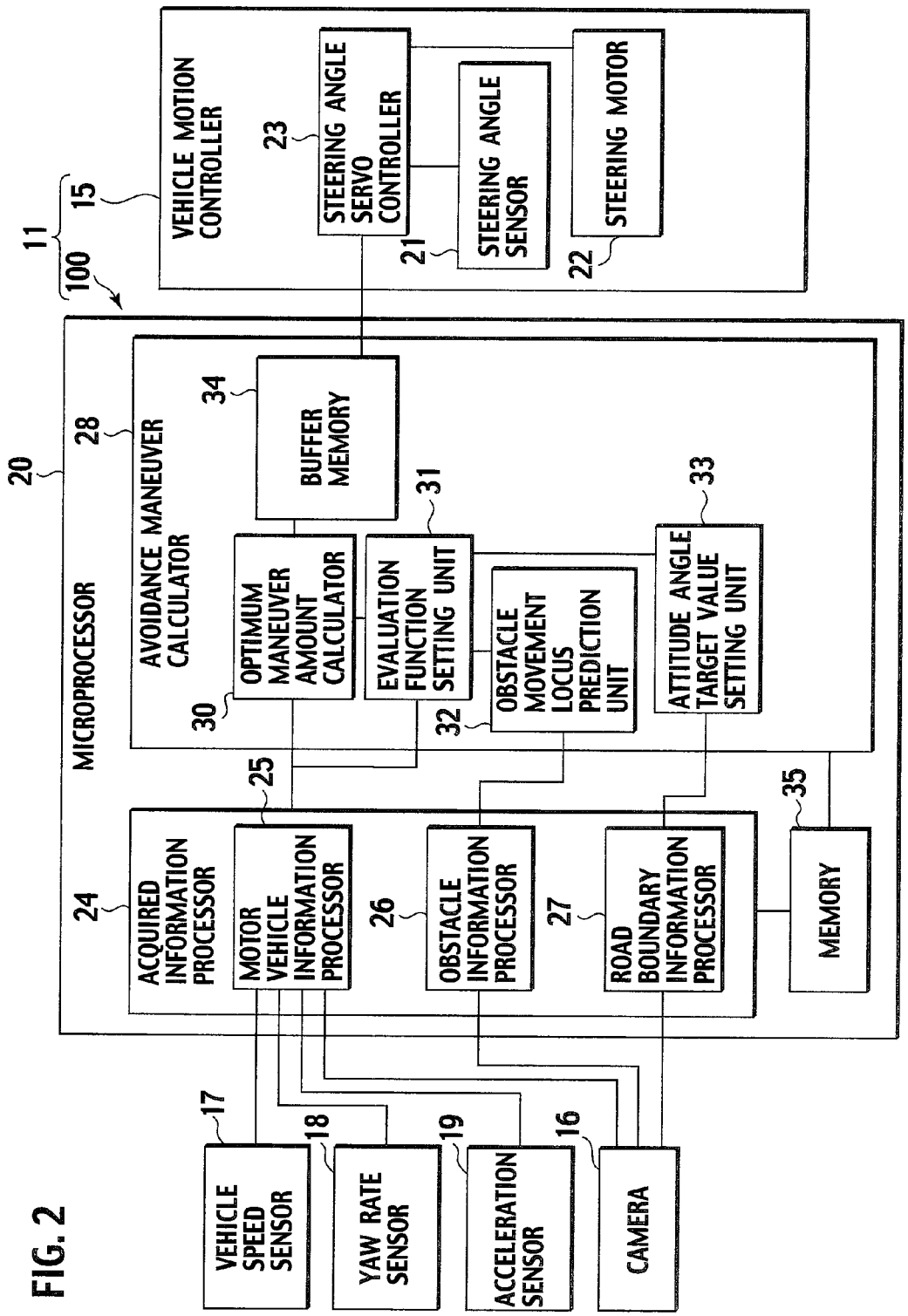
FIG. 2 is a block diagram showing the avoidance control device.

FIG. 1 is a plan view schematically showing a vehicle 12 employing an avoidance maneuver calculation device 10 and an avoidance control device 11 which includes the avoidance maneuver calculation device 10, according to the embodiment. FIG. 2 is a block diagram showing the avoidance control device 11.

When an obstacle 14 (see FIG. 3) exists on a road 13 where a vehicle 12 (an automotive vehicle) is traveling, the avoidance maneuver calculation device 10 calculates a driving maneuver amount that enables the vehicle 12 to avoid the obstacle 14. The avoidance control device 11 includes the avoidance maneuver calculation device 10 and a vehicle motion controller 15. The vehicle motion controller 15 performs driving maneuver by the driving maneuver amount calculated by the avoidance maneuver calculation device 10.

The vehicle 12 is provided with cameras 16, vehicle speed sensors 17, a yaw rate sensor 18, an acceleration sensor 19, a microprocessor 20, a steering angle sensor 21, a steering motor 22, and a steering angle servo controller 23. In the first embodiment, a rack-and-pinion front wheel steering mechanism is applied to the vehicle 12, and the steering angle sensor 21, the steering motor 22, and the steering angle servo controller 23 are provided so as to correspond to the front wheel steering system. As will be described later, the steering angle sensor 21 is fitted to the front wheel steering mechanism and is electrically connected to the steering angle servo controller 23. The steering angle servo controller 23 is electrically connected to the steering motor 22 and to the microprocessor 20. This microprocessor 20 is electrically connected to the cameras 16, the vehicle speed sensors 17, the yaw rate sensor 18, and the acceleration sensor 19, respectively.

The cameras 16 are disposed inside a vehicle room of the vehicle 12 and are configured to shoot images in front of the vehicle 12. In the first embodiment, paired cameras 16 are disposed respectively on the right and the left. An acquired information processor 24 (see FIG. 2) in the microprocessor 20, which will be described later, generates images by use of image signals from the cameras 16 and processes information in the images three-dimensionally. For instance, the acquired information processor 24 detects a distance from a position where the vehicle 12 is present to the obstacle 14 (see FIG. 3). The cameras 16 output the image signals to an automotive vehicle information processor 25, an obstacle information processor 26, and a road boundary information processor 27 (see FIG. 2), of the acquired information processor 24 to be described later.

The vehicle speed sensors 17 generate signals for detecting a traveling speed of the vehicle 12. In the first embodiment, the vehicle speed sensors 17 are formed of rotary encoders fitted to the wheels of the vehicle 12 and are configured to output pulse signals proportional to revolutions of the wheels, to the automotive vehicle information processor 25 (see FIG. 2).

The yaw rate sensor 18 outputs a signal for detecting a yaw rate of the vehicle 12, to the automotive vehicle information processor 25 (see FIG. 2). The yaw rate sensor 18 is formed of a quartz oscillator or a semiconductor.

The acceleration sensor 19 outputs a signal for detecting acceleration, in a specific direction, of the vehicle 12, to the automotive vehicle information processor 25 (see FIG. 2). The acceleration sensor 19 is formed of a piezoelectric element, for example. In the first embodiment, the acceleration sensor 19 is designed to generate the signal corresponding to the acceleration, in a width direction, of the vehicle 12.

The microprocessor 20 includes an A/D converter circuit, a D/A converter circuit, a central processor, a memory, and the like. The microprocessor 20 functions as the acquired information processor 24 and as an avoidance maneuver calculator 28 and also includes a memory 35 (see FIG. 2). As will be described later, the acquired information processor 24 generates various pieces of information by processing the signals from the cameras 16 and the sensors 17 to 19, while the avoidance maneuver calculator 28 calculates the driving maneuver amount based on the various pieces of information from the acquired information processor 24 and outputs a signal corresponding to the calculated driving maneuver amount to the steering angle servo controller 23. Since the microprocessor 20 calculates the driving maneuver amount in accordance with the signals from the cameras 16 and the sensors 17 to 19 as described above, the cameras 16, the sensors 17 to 19, and the microprocessor 20 function as the avoidance maneuver calculation device 10. The memory 35 stores therein the information and exchanges the information with the acquired information processor 24 and the avoidance operation calculator 28.

The steering angle servo controller 23 includes a microprocessor configured to perform various operations and a booster circuit or the like (not shown) for driving the steering motor 22, and executes servo control targeting at the driving maneuver amount, i.e. a steering angle, corresponding to the signal outputted from the avoidance maneuver calculator 28.

The steering angle sensor 21 outputs a signal for detecting an actually steered steering angle to the steering angle servo controller 23. The steering angle servo controller 23 utilizes information based on this signal as feedback information for servo control. In the first embodiment, the steering angle sensor 21 outputs a signal corresponding to a rack stroke amount in the front wheel steering mechanism to the steering angle servo controller 23. The steering angle servo controller 23 can detect the steering angle based on this signal.

The steering motor 22 performs steering in accordance with a signal from the steering angle servo controller 23, the steering performed independently from the maneuver by a driver. In the first embodiment, the steering motor 22 performs steering by rotating, with the motor, a pinion gear in the front wheel steering mechanism.

In this way, the steering angle servo controller 23 drives the steering motor 22 to perform steering. As the steering angle sensor 21 feeds the steering amount of this steering back to the steering angle servo controller 23, the driving maneuver is executed by the driving maneuver amount calculated by the avoidance maneuver calculation device 10. Therefore, the steering angle sensor 21, the steering motor 22, and the steering angle servo controller 23 function as the vehicle motion controller 15. For this reason, the avoidance maneuver calculation device 10 and the vehicle motion controller 15 constitute the avoidance control device 11, as shown in FIG. 2.

As described previously, the avoidance maneuver calculation device 10 includes the acquired information processor 24 configured to process signals from the cameras 16 and the sensors 17 to 19 and to generate various pieces of information, and the avoidance maneuver calculator 28 configured to calculate a driving maneuver amount based on the various pieces of information thus generated. In the first embodiment, the acquired information processor 24 includes the automotive vehicle information processor 25, the obstacle information processor 26, and the road boundary information processor 27. The automotive vehicle information processor 25 generates information on the automotive vehicle (the vehicle 12) in accordance with the signals from the cameras 16 and the sensors 17 to 19. The obstacle information processor 26 generates information on the obstacle 14. The road boundary information processor 27 generates information on a travelable range of the road 13.

In the first embodiment, automotive vehicle information (the information on the automotive vehicle) includes a position of the vehicle 12 relative to the road 13 on which the vehicle 12 is traveling, an attitude angle θ (see FIG. 4) of the vehicle 12, a yaw rate γ of the vehicle 12, a slip angle β (see FIG. 4) of the vehicle 12, and a traveling speed v of the vehicle 12. The attitude angle θ is the angle formed by a traveling direction of the vehicle 12 with respect to a direction of the road 13, i.e. the direction of extension of a track shape of the road 13. The slip angle β is the angle formed by an actual traveling direction of the vehicle 12 with respect to a traveling direction of the vehicle 12 which is predicted based on actual steering.

The position of the vehicle 12 relative to the road 13 is detected by image processing of the image signals outputted from the pair of cameras 16.

Assuming that the road is straight, the attitude angle θ is the angle formed between a boundary section 29 of the road 13 detected by the road boundary information processor 27 and a direction in which the vehicle 12 (the automotive vehicle) is oriented. The attitude angle θ may also be calculated by determining an appropriate initial value and integrating an output value from the yaw rate sensor 18. For example, this appropriate initial value is set to the traveling direction of the vehicle 12 running in the direction of the road 13, i.e. the direction in which the vehicle 12 was traveling before driving maneuver for avoidance takes place.

As described above, the yaw rate γ and the traveling speed v are detected by use of the signals outputted from the yaw rate sensor 18 and the vehicle speed sensor 17, respectively.

Assuming that a speed of the vehicle 12 in its longitudinal direction is $v_x$ and that a speed of the vehicle 12 in its width direction is $v_y$, the slip angle β is calculated by the following formula (1):

$$\beta = \arctan(v_y/v_x) \quad (1)$$

A speed component in the width direction is deemed to be sufficiently smaller than a speed component in the longitudinal direction, and $v_x$ is therefore defined as v. Meanwhile, the value $v_y$ is found by integrating the output from the acceleration sensor 19. For this reason, an approximate value of the slip angle β is obtained by the formula (1). Here, there is also a publicly-known technique for estimating a slip angle more accurately by an observer on the basis of a wheel speed, a yaw rate, a lateral speed, and so forth. Therefore, the slip angle β may also be found by using such a method.

The obstacle information is detected by performing image processing of the image signals inputted from the pair of cameras 16.

Figure 3:
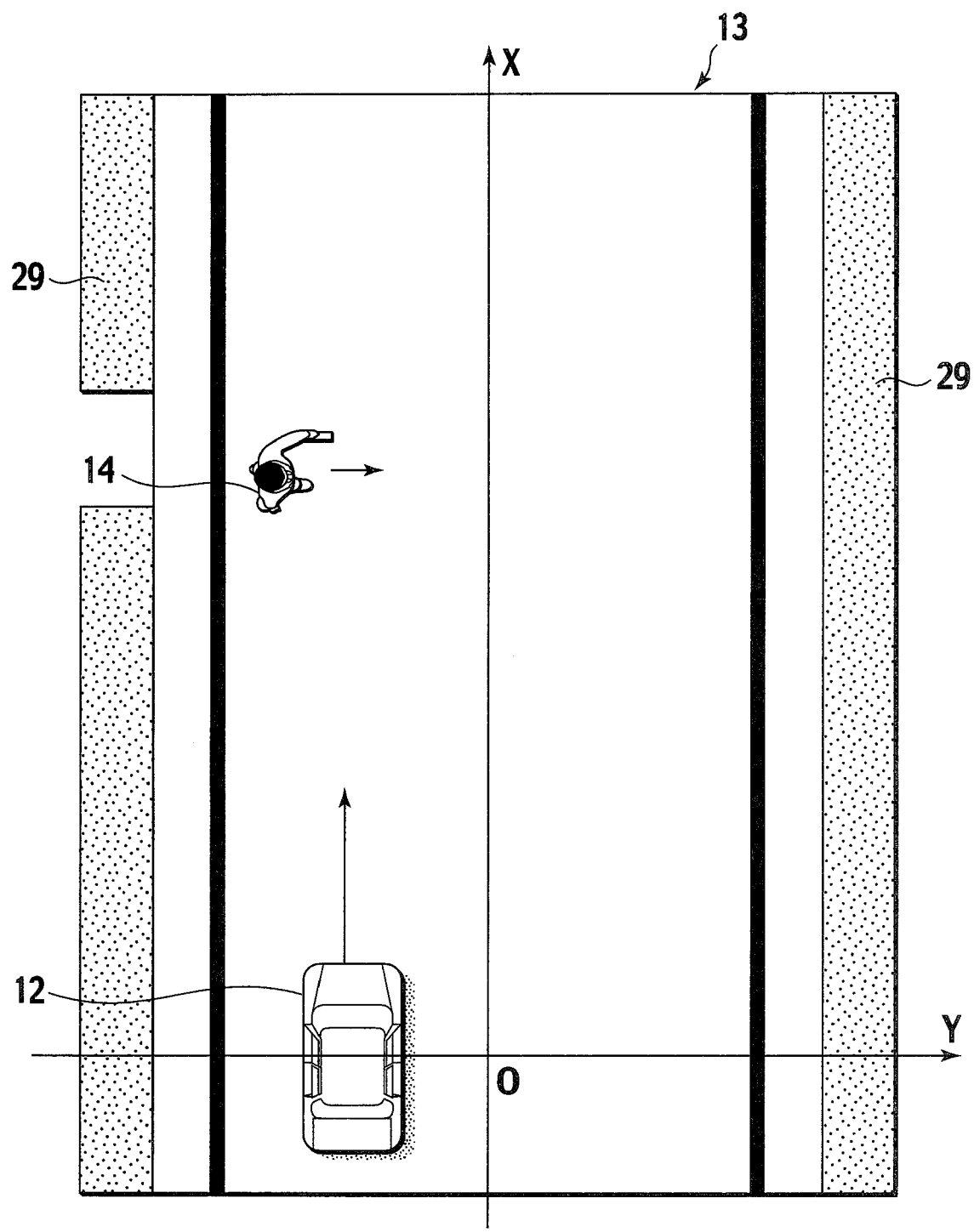
FIG. 3 is a schematic plan view showing a scene in which actual avoidance is assumed to be executed, in a first embodiment.

The travelable range of the road 13 is detected based on the road 13 and the boundary sections 29 (see FIG. 3). Here, the road 13 and the boundary sections 29 thereof are detected by performing image processing of the image signals inputted from the pair of cameras 16.

As described above, the automotive vehicle information processor 25 functions as an automotive vehicle information detector in cooperation with the cameras 16, the vehicle speed sensors 17, the yaw rate sensor 18, and the acceleration sensor 19. The obstacle information processor 26 functions as an obstacle detector in cooperation with the cameras 16. The road boundary information processor 27 functions as a road boundary detector in cooperation with the cameras 16. Here, detail description for methods of detecting an obstacle and road boundaries by image processing will be omitted herein because numerous methods for such detection have been disclosed as publicly-known techniques.

In this way, the acquired information processor 24 generates various pieces of desired information by using the signals from the cameras 16 and the sensors 17 to 19, and the avoidance maneuver calculator 28 calculates the driving maneuver amount based on this information.

The avoidance maneuver calculator 28 includes an optimum maneuver amount calculator 30, an evaluation function setting unit 31, an obstacle movement locus prediction unit 32, an attitude angle target value setting unit 33, and a buffer memory 34.

The optimum maneuver amount calculator 30 calculates, according to a current movement state of the vehicle, which state based on the automotive vehicle information, the most favorable, i.e. the optimum driving maneuver amount for the vehicle 12 among patterns of the possible driving maneuver amounts to be made on the vehicle 12 on the road in a period from current time to time after passage of a predetermined time, and stores calculated data in the buffer memory 34. In this way, the optimum maneuver amount calculator 30 finds the driving maneuver amounts not for the current time only, but for the current time to the time after passage of the predetermined time. Accordingly, it is necessary to predict the movement state of the vehicle 12 in the future. A vehicle motion model is used for this prediction. As will be explained later, the vehicle motion model describes a predicted traveling locus on a coordinate system, which is set up for describing motions of the vehicle 12 and the obstacle 14, based on the driving maneuver amount and the movement state of the vehicle 12 at the current time. The pieces of information on the obstacle 14 and on the boundary sections 29 of the road 13 are linked with coordinate values, i.e. expanded, in this coordinate system, so that the various pieces of information and the predicted traveling locus are integrally handled (see FIG. 4).

Figure 4:
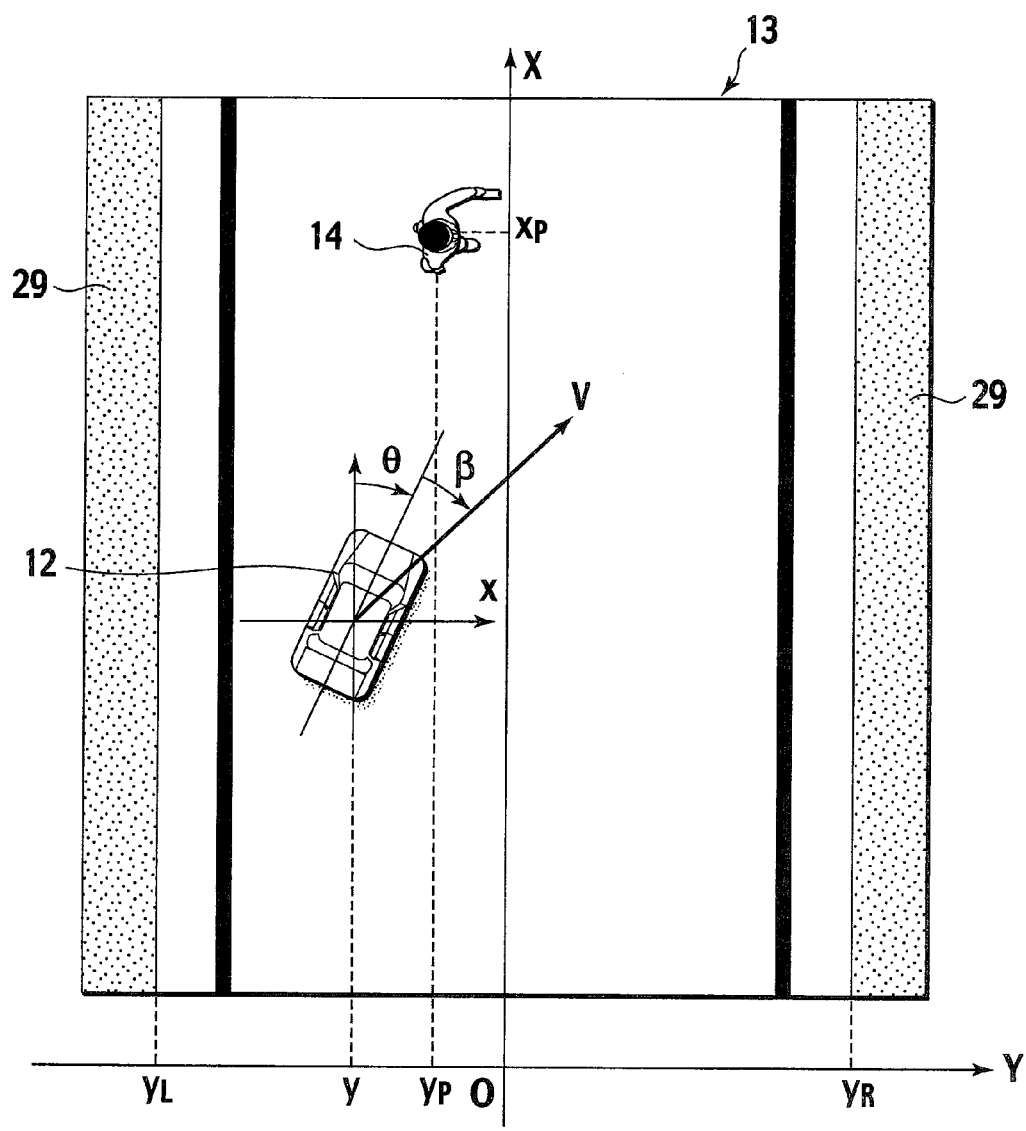
FIG. 4 is a plan view for explaining expansion of processed information in a coordinate system.

In the first embodiment, as shown in FIG. 3 and FIG. 4, an X axis is set up in a direction along the road 13 while a Y axis is set up in a perpendicular direction to the X axis, i.e. a width direction of the road 13. Coordinate origins are arbitrarily selected. As an example, in the first embodiment, a current position of the vehicle 12 is defined as the origin of the X coordinate and a point near a center line of the road is defined as the origin of the Y coordinate (see FIG. 3). By setting up the coordinate system, it is possible to express the positions of the vehicle 12, the obstacle 14, and the boundary sections 29 by way of the coordinate values. In the following description, the position of the vehicle 12 (the automotive vehicle) is defined as $(X,Y)=(x,y)$ from the viewpoint of a barycentric point thereof, the position of the obstacle 14 (which is a pedestrian in the first embodiment) is defined as $(X,Y)=(x_p,y_p)$, the boundary section 29 on the left side of the road 13 is defined as $Y=y_L$, and the boundary section 29 on the right side of the road 13 is defined as $Y=y_R$ (see FIG. 4).

Meanwhile, in order to calculate the most favorable driving maneuver amount for the vehicle 12 among the patterns of possible driving maneuver amounts to be made on the vehicle 12, the optimum maneuver amount calculator 30 uses an evaluation function J that defines what kind of driving maneuver is the most favorable driving maneuver for the vehicle 12.

The evaluation function J is formed of an equation that expresses items required in the vehicle 12. In this way, a concrete driving maneuver pattern and appropriateness of an automotive vehicle motion pattern associated therewith, i.e. appropriateness of a vehicle condition, are numerically evaluated. In a scene to avoid accession to the position of the obstacle 14, the avoidance maneuver calculation device 10 according to the embodiment is most importantly required not to reach the position of the obstacle 14 and then to cause the traveling locus, which is to be traced by the vehicle 12, to be located within the travelable range of the road, the traveling locus being based on the calculated driving maneuver amount. These two required items are evaluated by a space between the obstacle 14 and the vehicle 12, and a space between the boundary sections 29 of the road 13 and the vehicle 12. When the obstacle 14 is in motion, such information is included in the evaluation function J. The obstacle movement locus prediction unit 32 predicts the movement locus of the detected obstacle 14.

The obstacle movement locus prediction unit 32 estimates a movement speed of the obstacle 14, based on a detection history of the obstacle 14 up to the current time, and then calculates the movement locus on the assumption that the obstacle 14 will perform a uniform linear motion while maintaining the estimated movement speed. Assuming that the position of the obstacle at the current time $t_0$ is $(x^0_p, y^0_p)$ and that the estimated value of the movement speed of the obstacle 14 is $(v^x_p, v^y_p)$, an estimated value of a position of the obstacle 14 at time t is expressed by the following formulae (2) and (3):

$$x_p(t)=x^0_p+v^x_p(t-t_0) \quad (2)$$

$$y_p(t)=y^0_p+v^y_p(t-t_0) \quad (3)$$

Moreover, in the scene to avoid the obstacle 14, it is also required to bring an attitude of the vehicle after avoidance to a condition matching a traffic circumstance in that place. The attitude angle target value setting unit 33 calculates an appropriate attitude angle target value $\theta^*$ in order to reflect a desirable attitude of the vehicle 12 after the avoidance to the evaluation function J. The setup of the attitude angle target value $\theta^*$ by the attitude angle target value setting unit 33 will be described later. This attitude angle target value $\theta^*$ is the value of a target attitude angle of the automotive vehicle which is set up corresponding to a location where the vehicle 12 traveling on the road 13 reaches at evaluation ending time $(t_0+T)$ to be described later.

Next, the vehicle motion model and calculation of the movement state of the vehicle 12 using the vehicle motion model will be described. While it is possible to utilize various models as the vehicle motion model, in the first embodiment motion prediction is carried out based on a two-wheel model which approximates motion of a four-wheel vehicle by motion of a two-wheel vehicle.

Assuming that the vehicle speed is constant, the two-wheel mode is described by the following differential equations (4) to (9). Here, the expression x' indicates temporal differentiation of the value x.

$$x'=v\cos(\beta+\theta) \quad (4)$$

$$y'=v\sin(\beta+\theta) \quad (5)$$

$$\theta'=\gamma \quad (6)$$

$$v'=0 \quad (7)$$

$$\beta'=-\gamma+2\{Y_f(\beta_f)+Y_r(\beta_r)\}/mv \quad (8)$$

$$\gamma'=2l_fY_f(\beta_f)/I-2l_rY_r(\beta_r)/I \quad (9)$$

Figure 5:
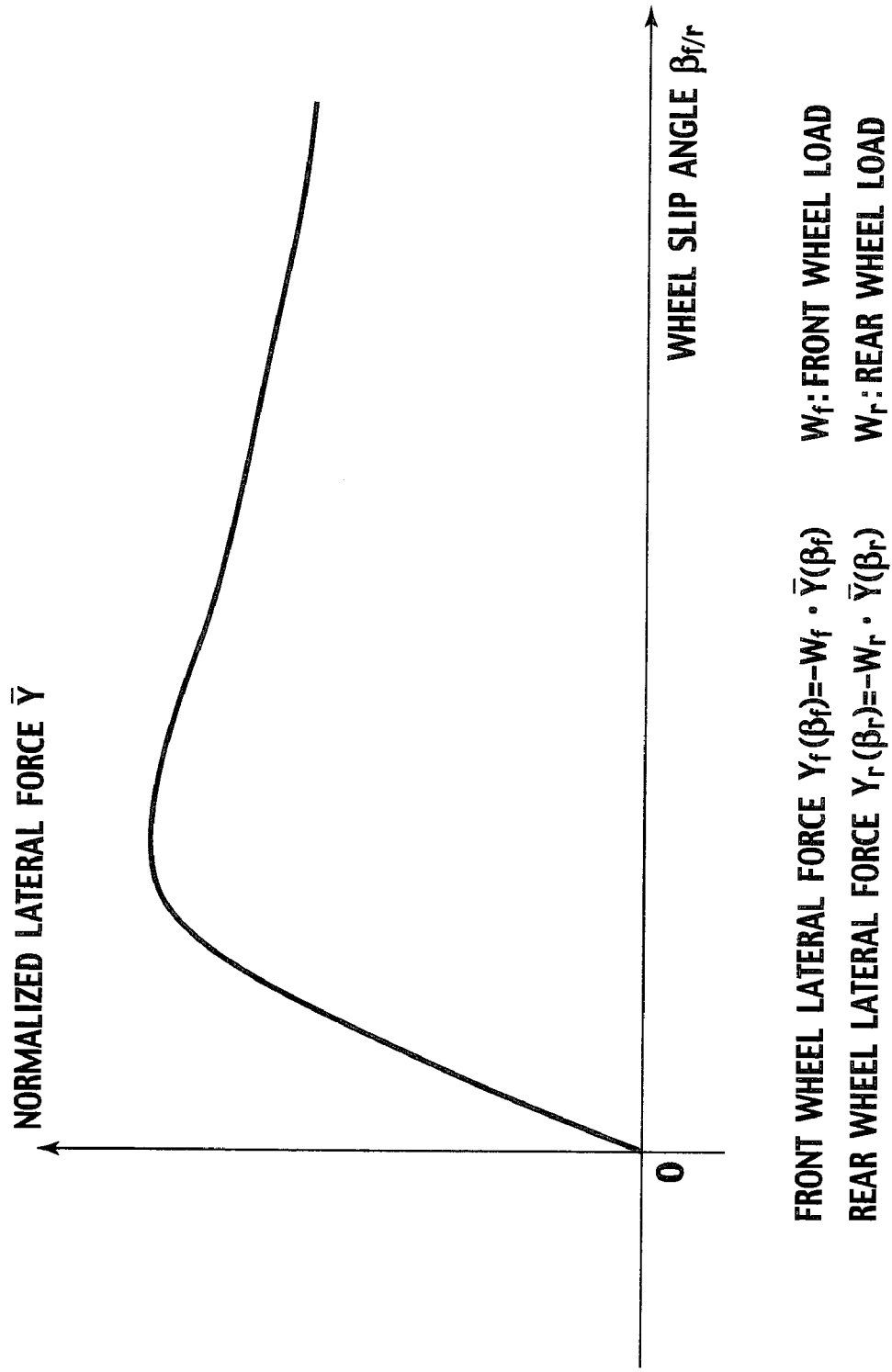
FIG. 5 is a graph showing an example of a functional form of a lateral force of a tire in a vehicle motion model.

Here, as described previously, the value $\theta$ is the attitude angle (a yaw angle) of the vehicle 12, the value $\beta$ is the slip angle, the value v is the traveling speed, and the value $\gamma$ is the yaw rate. Meanwhile, the value m represents a weight of the vehicle 12, the value I represents a vehicle yaw inertia moment generated in the vehicle 12, the value $l_f$ represents a distance from the center of gravity of the vehicle to a front wheel shaft, and the value $l_r$ represents a distance from the center of gravity of the vehicle 12 to a rear wheel shaft. The value $Y_f$ is a function representing a tire lateral force of a front wheel and the value $Y_r$ is a function representing a tire lateral force of a rear wheel, which are assumed to be the functions of a front wheel slip angle $\beta_f$ and a rear wheel slip angle $\beta_r$, respectively. A concrete example of a functional shape is shown in FIG. 5. Note that the value $W_f$ shown in FIG. 5 is a front wheel load while the value $W_r$ is a rear wheel load. Here, when a front wheel steering angle is defined as $\delta$, the values $\beta_f$ and $\beta_r$ are expressed by the following formulae (10) and (11):

$$\beta_f=\beta+l_f\gamma/v-\delta \quad (10)$$

$$\beta_r=\beta-l_r\gamma/v \quad (11)$$

When the above-described model is used, a state vector x representing the movement state of the vehicle 12 is a six-dimensional vector expressed as:

(Expression 1)

$$x=(x\,y\,\theta\,v\,\beta\,\gamma) \quad (12)$$

The model expressed by the formulae (4) to (9) is a non-linear differential equation taking $\delta$ as an input, and is represented by a general expression formula below when the right side of the model is collectively expressed as a vector value function f:

(Expression 2)

$$x'=f(X,\delta) \quad (13)$$

Therefore, the value of the state vector x representing the movement state of the vehicle 12 is calculated based on the detective values by the sensors 17 to 19.

Next, the evaluation function J will be described. The evaluation function J is formed of a function of the following formula (14):

(Expression 3)

$$J = \psi(x(t_0+T)) + \int_0^{0+T} L(x(\tau), \delta(\tau), \tau) d\tau \quad (14)$$

Note that the code ψ is an evaluation formula for evaluating desirability of the attitude and the position of the vehicle 12 at the time ($t_0$+T). The code L is an evaluation formula for evaluating desirability of the movement state of the vehicle 12 and of the driving maneuver amount at each time point from the current time $t_0$ to the time ($t_0$+T). The value τ is an integration variable that varies from the current time $t_0$ to the time ($t_0$+T).

In the first embodiment, the evaluation formula L is formed by combining evaluation items reflecting the following required items. Specifically, the evaluation formula L includes evaluation standards representing the following required items.

Required item 1: The vehicle 12 does not come too close to the obstacle 14.

Required item 2: The vehicle 12 does not come too close to the boundary section 29 of the road 13.

Required item 3: The front wheel steering angle δ is not set too large.

The required item 1 indicates a state of accession of the vehicle 12 to the obstacle 14, which is expressed by a function deriving a value that becomes greater as the distance between the vehicle 12 and the obstacle 14 becomes smaller. The required item 1 is expressed by the function of the following formula (15), for example:

(Expression 4)

$$L_P(x, y, x_p, y_p) = \exp\left(-\frac{(x-x_p)^2}{\sigma_x^2} - \frac{(y-y_p)^2}{\sigma_y^2}\right) \quad (15)$$

The values $\sigma_x$ and $\sigma_y$ are parameters for determining the shape of the function. Here, the value corresponding to the width in the X axis direction of the detected obstacle 14 is defined as $\sigma_x$ while the value corresponding to the width direction in the Y axis direction thereof is defined as $\sigma_y$. When information on the X axis direction representing the depth direction of the obstacle 14 is unobtainable, $\sigma_x = \sigma_y$ is set. The position ($x_p, y_p$) of the obstacle 14 is calculated based on the value of the movement locus of the obstacle 14 calculated by the obstacle movement locus prediction unit 32. Here, when the obstacle 14 remains stationary, the position ($x_p, y_p$) of the obstacle 14 is defined as the position of the obstacle 14 obtained from the obstacle information processor 26.

The required item 2 indicates a state of accession of the vehicle 12 to the boundary section 29 of the road 13, and is expressed by a function deriving a value that becomes greater as the distance between the vehicle 12 and the boundary 29 of the road 13 becomes smaller. To be more precise, the required item 2 is expressed by the function of the following formula (16), for example:

(Expressions 5)

$$L_R(x, y) = \begin{cases} \frac{1}{2}(y - y_L - \Delta)^2 & \wedge \quad y \leq y_L + \Delta \\ 0 & \wedge \quad y_L + \Delta < y < y_R - \Delta \\ \frac{1}{2}(y - y_R + \Delta)^2 & \wedge \quad y \geq y_R - \Delta \end{cases} \quad (16)$$

Note that the value Δ is a parameter for designating an accession margin to the boundary sections 29, and an avoidance route that secures a larger clearance between the vehicle 12 and the obstacle 14 is calculated as the value Δ becomes greater.

Figure 6:
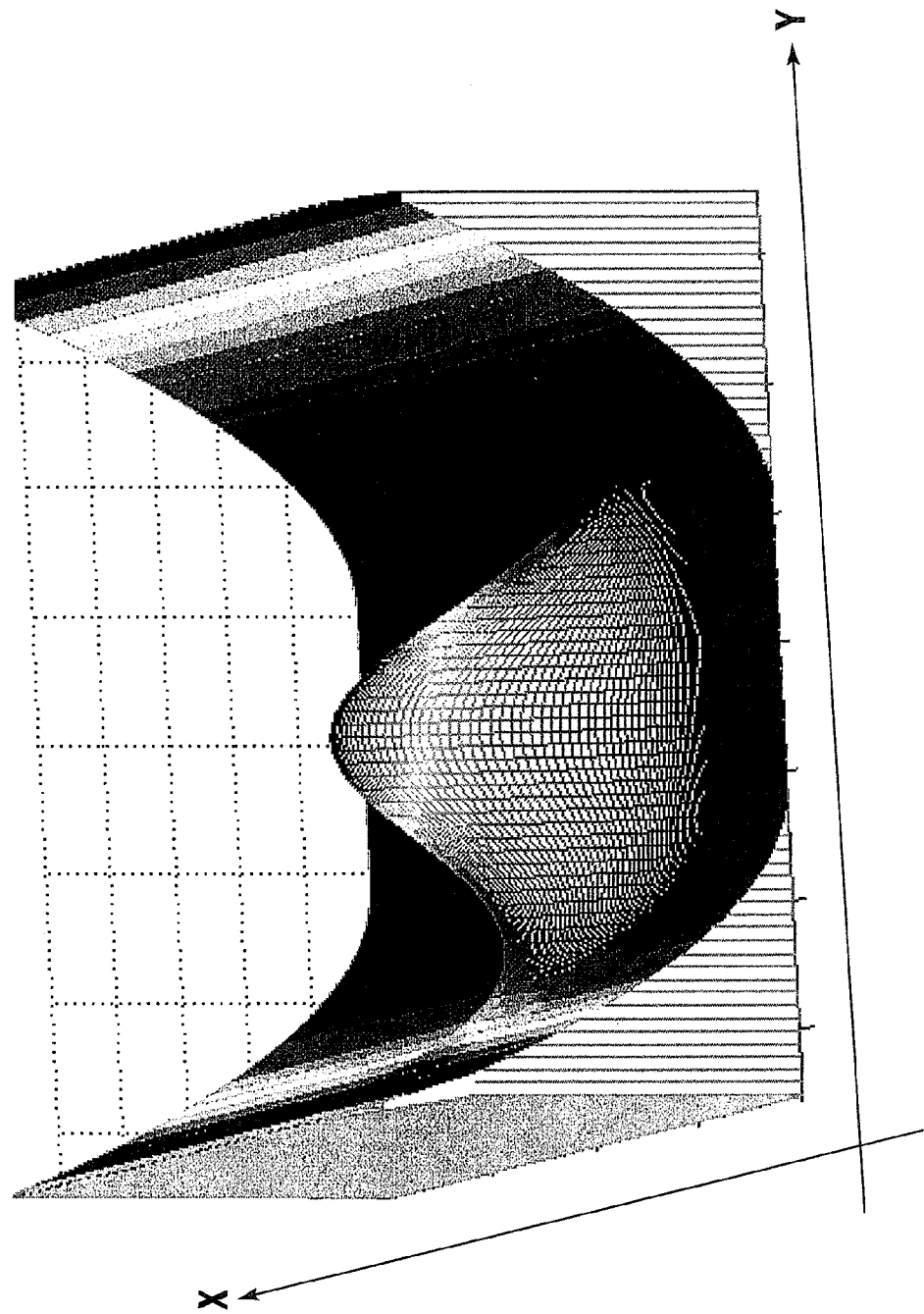
FIG. 6 is a graph showing an example of a functional form of an evaluation item at a certain time point, the evaluation item being composed of an obstacle and a road boundary in the assumed scene of the first embodiment.

Evaluation formulae $L_P$ and $L_R$ define risk potentials which reflect, on the road 13 expanded in the coordinate system, accession risks to the positions of the obstacle 14 and the boundary sections 29 of the road 13. FIG. 6 shows a diagram plotting, on the X-Y coordinates, a function obtained by addition of the evaluation formulae $L_P$ and $L_R$. A hill in the center represents the potential formed by the function $L_P$ corresponding to the obstacle 14 while hills on both sides represent potentials formed by the function $L_R$ corresponding to the boundary sections 29 of the road 13. The avoidance route is generated so as to trace a zone having low values of the risk potentials shown in FIG. 6 as closely as possible.

The required item 3 indicates a state of maneuver of the driving maneuver amount made on the vehicle 12, and is the item to be introduced to require efficient execution of avoidance by performing the driving maneuver for avoidance at the smallest possible steering angle. The required item 3 is expressed by a function of the following formula (17), for example:

$$L_F(\delta) = \delta^2/2 \quad (17)$$

The evaluation formula L is the function derived by applying appropriate weights to these three evaluation formulae and then adding them together. That is, assuming that values $W_P$, $W_R$, and $W_F$ are the weights to the respective required items 1, 2, and 3, the evaluation formula L is expressed by the following formula (18):

$$L = W_P L_P + W_R L_R + W_F L_F \quad (18)$$

The evaluation formula ψ is the item for evaluating the attitude of the vehicle at the evaluation ending time ($t_0$+T) after the avoidance to be described later, i.e. at the time of ending the evaluation of the movement state of the vehicle 12. To be more precise, this is formed of the expression configured to set up, as an attitude angle target value θ* (a yaw angle target value), the attitude of the vehicle that allows the automotive vehicle to transit afterward to normal travel smoothly after the evaluation ending time ($t_0$+T), and to require to minimize deviation between the attitude angle target value θ* and a vehicle attitude angle predicted value (a predicted attitude angle) θ($t_0$+T) at the evaluation ending time ($t_0$+T). For this reason, the evaluation formula ψ evaluates the state of attitude of the vehicle 12 determined by the attitude angle target value θ* and the vehicle attitude angle predicted value (the predicted attitude angle) θ. For example, a function of the following formula (19) is utilized as such an evaluation formula:

$$\psi_{yaw}(\theta) = (\theta - \theta^*)^2/2 \quad (19)$$

An evaluation item at the evaluation ending time ($t_0$+T) is formed by applying an appropriate parameter $W_{yaw}$ to this function, namely:

$$\psi = W_{yaw} \psi_{yaw} \quad (20)$$

The respective items evaluated by this evaluation formula L and the evaluation formula ψ represent the vehicle condition of the automotive vehicle.

Meanwhile, the evaluation function setting unit 31 determines a length T of an evaluation period in the evaluation function J of the formula (14). In order to calculate the maneuver amount in consideration of a behavior of the vehicle after the vehicle 12 avoids the obstacle 14, it is necessary to extend the evaluation period to the time after the avoidance of the obstacle 14. A state of avoidance is defines as a state in which the vehicle 12 and the obstacle 14 have the same X coordinate and in which the Y coordinates of the vehicle 12 and the obstacle 14 are sufficiently distant. When the traveling speed v of the vehicle can be deemed as constant, time $T_A$ for the vehicle 12 to avoid the obstacle 14 is estimated by the following formula:

$$T_A = \{x^0_p - x(t)\}/(v - v_Y) \qquad (21)$$

The length T of the evaluation period needs to be secured at least longer than the time $T_A$ considering the time to avoid the obstacle 14. The degree of consideration of the movement after the avoidance varies depending on the scene. However, assuming that the time required by the vehicle from a start of an avoidance movement to the avoidance of the obstacle 14 is approximately equal to the time required by the vehicle from the avoidance of the obstacle 14 to recovery of normal travel, the length T of the evaluation period is set up as shown in the following formula (22):

$$T = 2T_A \qquad (22)$$

For this reason, in the first embodiment, if the time to start an operation for avoiding the obstacle 14 is defined as evaluation starting time to, avoidance time when vehicle 12 avoids the obstacle 14 is equal to $(t_0+T_A)$, and the evaluation ending time to end the evaluation of the movement state of the vehicle 14 is equal to $(t_0+T)=(t_0+2T_A)$.

In this way, the evaluation function J can evaluate each set of predicted traveling loci to be described by the vehicle movement model in the period from the evaluation starting time $t_0$ to the evaluation ending time $(t_0+T)$. This evaluation is expressed as the value of the evaluation function J, and the predicted traveling locus corresponding to the minimum value of the evaluation function J is an optimum predicted traveling locus when comprehensively judging the respective items evaluated by the evaluation formula L and the evaluation formula ψ. It is possible to obtain the optimum driving maneuver amount by calculating the driving maneuver amount to draw this optimum traveling locus based on the vehicle movement model.

Figure 7:
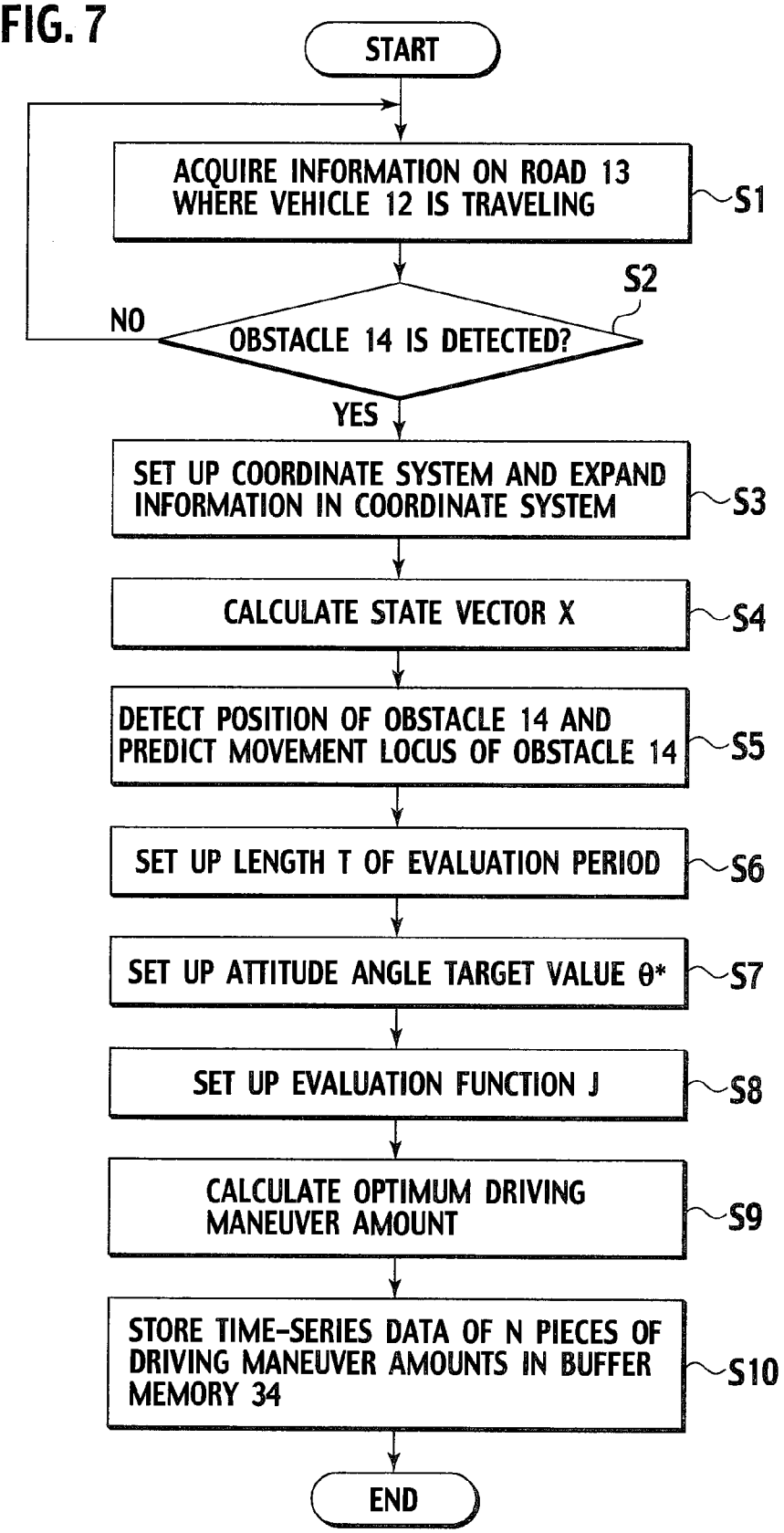
FIG. 7 is a flowchart showing processing by the avoidance maneuver calculation device.

Next, the process to calculate the driving maneuver amount by the avoidance maneuver calculation device 10 according to the embodiment in order to avoid the obstacle 14 will be described along a flowchart shown in FIG. 7. This flowchart assumes the scene in FIG. 3. FIG. 3 represents the scene where the vehicle 12 being the automotive vehicle is traveling on the road 13 having both sides partitioned by fences (the boundary sections 29) while the pedestrian (the obstacle 14) runs from the left side in front of the vehicle 12 into the travelable range of the road 13.

Based on the information processed by the acquired information processor 24, the avoidance maneuver calculator 28 recognizes the road 13 where the vehicle 12 is traveling, the boundary sections 29 thereof, and the travelable range for the vehicle 12 on the road 13, judges whether or not there is the obstacle 14 within the travelable range for the vehicle 12, and continues such confirmation (Step S1). Here, the information processed by the acquired information processor 24 based on the signals outputted from the sensors 17 to 19 is stored in the memory 35, and the information in the memory 35 is rendered readable by the avoidance maneuver calculator 28.

When detecting that the obstacle 14 (which is the pedestrian in the first embodiment) within the travelable range of the road 13, the avoidance maneuver calculator 28 goes to Step S3 to calculate the driving maneuver amount for avoiding this obstacle 14 (Step S2). The evaluation function setting unit 31 sets up the time $(t_0)$ of detection of the obstacle 14 as the evaluation starting time $t_0$. If the obstacle 14 (which is the pedestrian in the first embodiment) is not present within the travelable range of the road 13, the process returns to Step S1 to continue confirmation of presence of the obstacle 14 on the road 13.

The avoidance maneuver calculator 28 sets up the coordinate system (see FIG. 3) and expands the information stored in the memory 35 and the information processed by the acquired information processor 24 appropriately into the coordinate system thus set up (see FIG. 4) (Step S3).

Based on the information processed by the acquired information processor 24, the avoidance maneuver calculator 28 calculates the value of the state vector x (see the formula (13)) representing the movement state of the vehicle 12 (Step S4).

Based on the information processed by the acquired information processor 24, the obstacle movement locus prediction unit 32 calculates the prediction of the movement locus of the obstacle 14, i.e. the position $(x_p, y_p)$ of the obstacle 14 at arbitrary time t by using the formulae (2) and (3) (Step S5). Here, when judging, based on the information processed by the acquired information processor 24, that the obstacle 14 remains stationary, the avoidance maneuver calculator 28 does not calculate the movement locus of the obstacle 14 by using the obstacle movement locus prediction unit 32.

Based on the information processed by the acquired information processor 24, the evaluation function setting unit 31 sets up the length T of the evaluation period by using the formulae (19) and (20) (Step S6).

The attitude angle target value setting unit 33 sets up the attitude angle target value θ* (Step S7). The setup of the attitude angle target value θ* will be described below.

The attitude angle target value θ* is the attitude angle required for the vehicle 12 to adapt to a status of a position where the vehicle 12 is predicted to be present at the evaluation ending time $(t_0+T)=(t_0+2T_A)$, and is used for setting up the evaluation formula ψ (see the formula (20)). In the case of the scene assumed in the first embodiment, it is desirable that the vehicle 12 return to the normal traveling state on the road 13 at the time point of the evaluation ending time $(t_0+T)$ after completion of the driving maneuver to avoid accession to the position of the obstacle 14. Accordingly, it is desirable that the vehicle 12 travel along the direction of the road 13 at the time point of the evaluation ending time $(t_0+T)$. For this reason, the attitude angle of the vehicle 12 at the evaluation ending time $(t_0+T)$ may be set up so as to coincide with the direction of the road 13. Therefore, the attitude angle target value θ*=0 is set.

The evaluation function setting unit 31 sets up the evaluation function J (see the formulae (14), (18), (20), and (22)), based on the information processed by the acquired information setting unit 24, the information from the obstacle movement locus prediction unit 32, and the information from the attitude angle target value setting unit 33 (Step S8) at a current time $(t_0)$.

Based on the above-described vehicle movement model and on the evaluation function J, the optimum maneuver amount calculator 30 calculates the optimum driving maneuver amount achieving the most favorable (the smallest) value of the evaluation function J (Step S9). A problem to find the maneuver amount that achieves the most favorable value of the evaluation function J is widely known as an optimum control problem, and algorithms for calculating a numerical solution thereof have been disclosed as publicly-known references. One of the references is "A continuation/GMRES method for fast computation of nonlinear receding horizon control" (T. Ohtsuka, Automatica, Vol. 40, p. 563-574, 2004).

In the case of the first embodiment, since the optimum driving maneuver amount is equal to the front wheel steering angle δ, time-series data of front wheel steering angle maneuver amounts for the period from the evaluation starting time $t_0$ to the evaluation ending time $(t_0+T)$ are calculated. In the actual calculation of the optimum driving maneuver amount, the evaluation period is divided into an appropriate number of steps N (predetermined intervals), and the optimum driving maneuver amount is calculated at a time point of each discretized step. That is, N pieces of the time-series data of the front wheel steering angle δ are obtained, namely:

(Expression 6)

$$\delta^* = \left(\delta(t_0)\ \delta\left(t_0+\frac{T}{N}\right)\ \delta\left(t_0+\frac{2T}{N}\right) \wedge\ \delta\left(t_0+\frac{N-1}{N}T\right)\right) \quad (23)$$

The avoidance maneuver calculator 28 stores, in the buffer memory 34, N pieces of the time-series data of the front wheel steering angles δ (the optimum driving maneuver amounts) calculated by the optimum maneuver amount calculator 30 (Step S10).

As shown in this flowchart, the avoidance maneuver calculation device 10 calculates the most favorable driving maneuver amounts. In the first embodiment, the avoidance maneuver calculation device 10 constitutes part of the avoidance control device 11, and the steering corresponding to each of the optimum driving maneuver amounts is performed by the vehicle motion controller 15 that constitutes the other part.

Figure 8:
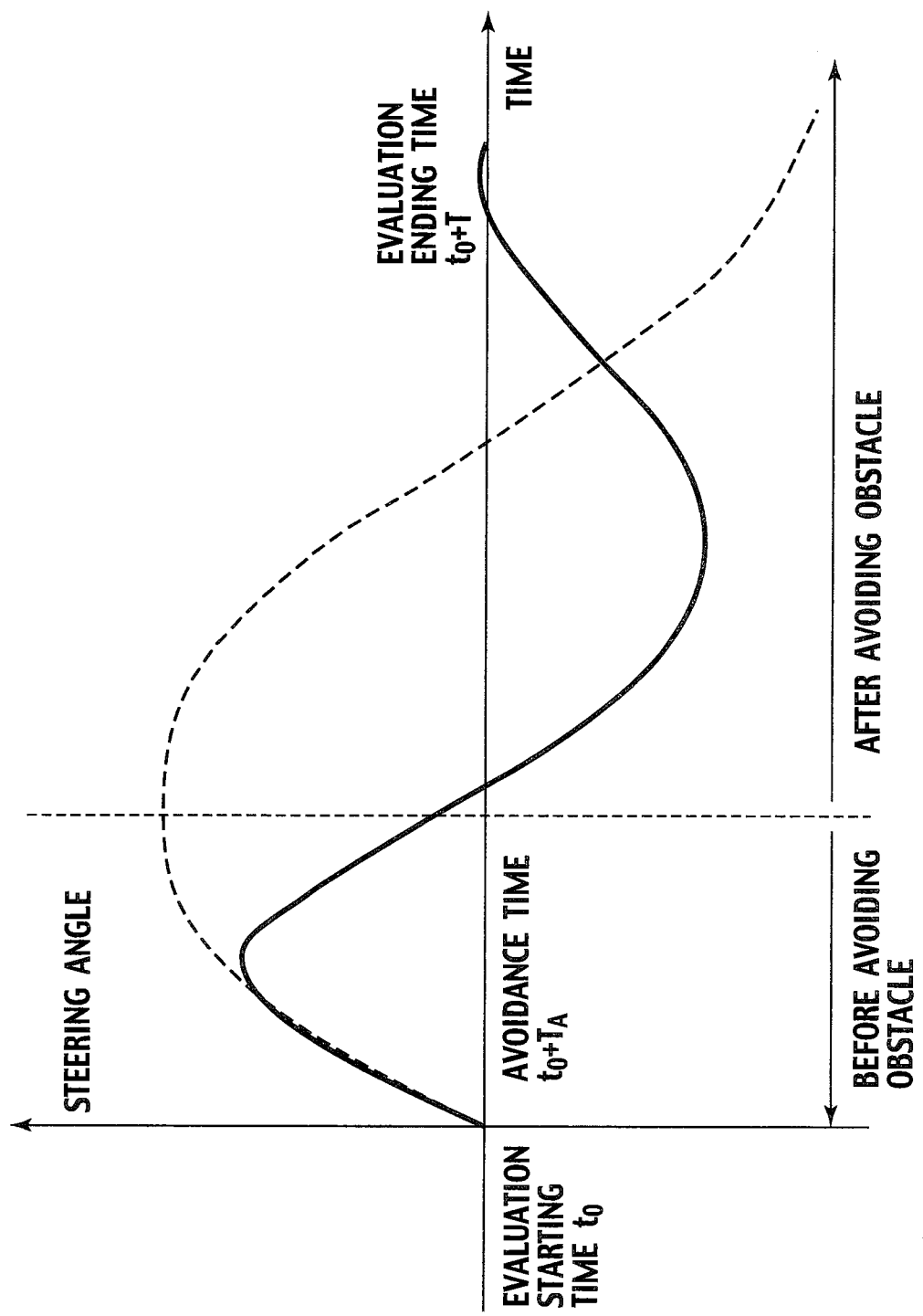
FIG. 8 is a graph showing an example of an optimum driving maneuver amount calculated by the avoidance maneuver calculation device of the first embodiment.
Figure 9:
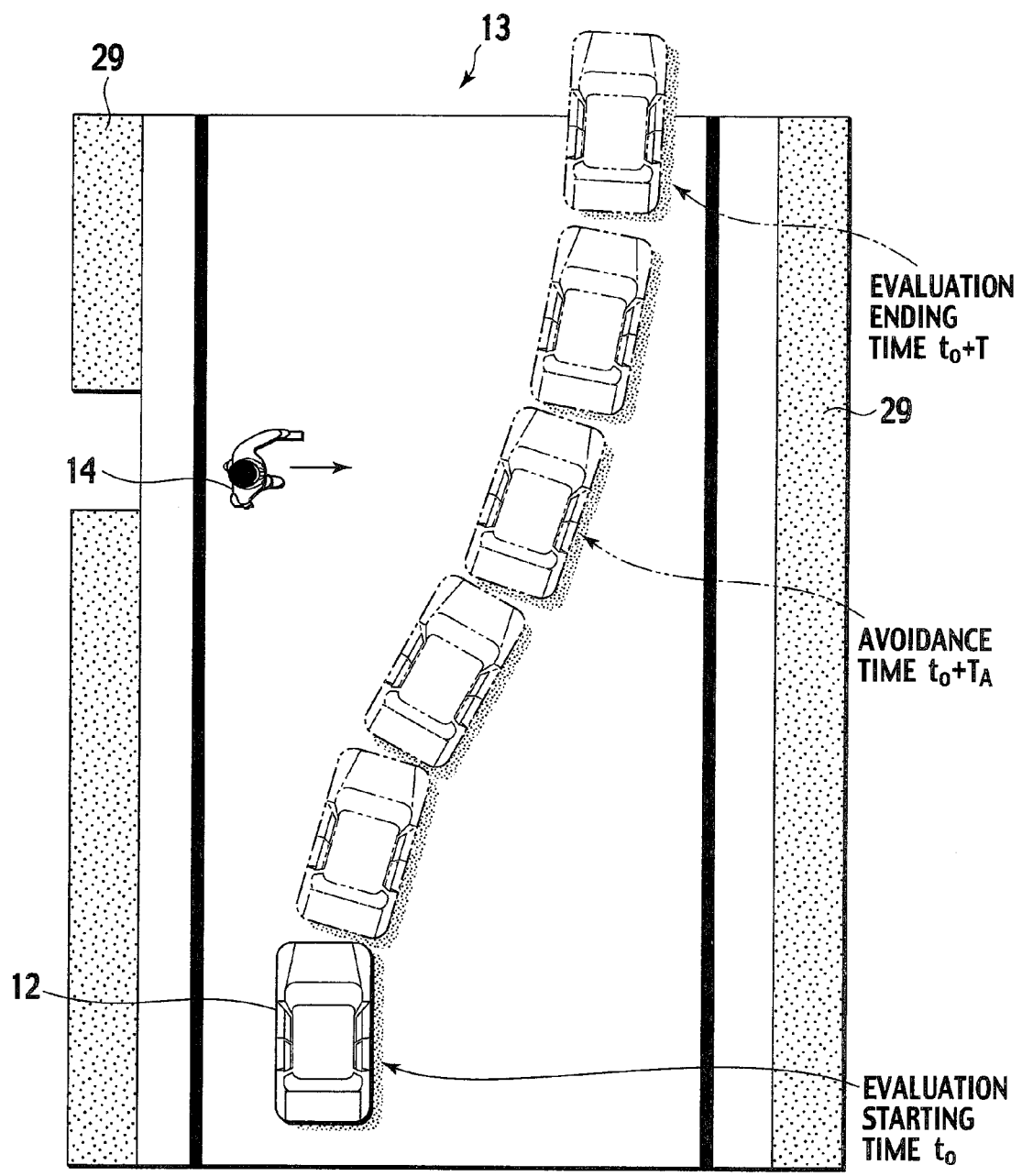
FIG. 9 is a plan view showing a movement locus of avoidance of an obstacle for a vehicle executed by the avoidance control device of the first embodiment.

The vehicle motion controller 15 is initiated when the time-series data of the optimum driving maneuver amounts (N pieces of the front wheel steering angles δ) are stored in the buffer memory 34, then reads the data stored in the buffer memory 34 sequentially along the time series of the optimum driving maneuver amounts at a time cycle of T/N, and then executes servo control of the front wheel steering angles while setting, as target steering angles, the thus-read front wheel steering angles δ being the optimum driving maneuver amounts. The vehicle motion controller 15 terminates the servo control when all the optimum driving maneuver amounts set in the buffer memory 34 are read out. Simultaneously with this termination, the vehicle 12 returns to the normal traveling state to allow a driver to perform driving maneuver. A graph showing the optimum driving maneuver amounts calculated for avoiding the obstacle 14 is shown in FIG. 8, and the movement locus of the vehicle 12 based on these optimum driving maneuver amounts is shown in FIG. 9. Here, in FIG. 9, the vehicle 12 and the obstacle 14 at the evaluation starting time to are indicated with solid lines while the movement loci of the vehicle 12 and the obstacle 14 from that point to the evaluation ending time $(t_0+T)$ when the avoidance is completed are indicated with chain double-dashed lines.

As shown in FIG. 9, the vehicle 12 can avoid the obstacle 14 and the boundary sections 29 of the road 13 by using the avoidance control device 11. Moreover, at the evaluation ending time when the driving maneuver for the avoidance by the avoidance control device 11 is completed, the vehicle 12 travels within the travelable range of the road 13 in a traveling attitude along the direction of the road 13 (the attitude angle θ=0°.

The avoidance maneuver calculation device 10 according to the embodiment calculates the optimum driving maneuver amounts while considering the degrees of accession not only to the obstacle 14 but also to the boundary sections 29 of the road 13. Therefore, it is possible to calculate the optimum driving maneuver amounts for avoiding the obstacle 14 within the travelable range of the road 13.

Moreover, the avoidance maneuver calculation device 10 calculates the optimum driving maneuver amounts while further considering the recovery of the attitude angle θ of the vehicle 12 back to the direction of the road 13 after avoiding the obstacle 14. Specifically, as shown in FIG. 8, the avoidance maneuver calculation device 10 calculates the driving maneuver amount so as to start putting the front wheel angle back at a stage of prediction that it is possible to secure a movement amount in the Y axis direction (the width direction of the road 13) necessary for avoiding the obstacle 14, then to invert the steering angle to an opposite phase immediately after avoiding the obstacle 14, and to return to a neutral position (the attitude angle θ=0° on or before the evaluation ending time $(t_0+T)$. For this reason, as shown in FIG. 9, it is possible to calculate the optimum driving maneuver amounts to enable the vehicle 12 to avoid the obstacle 14 and the boundary sections 29 of the road 13.

Figure 10:
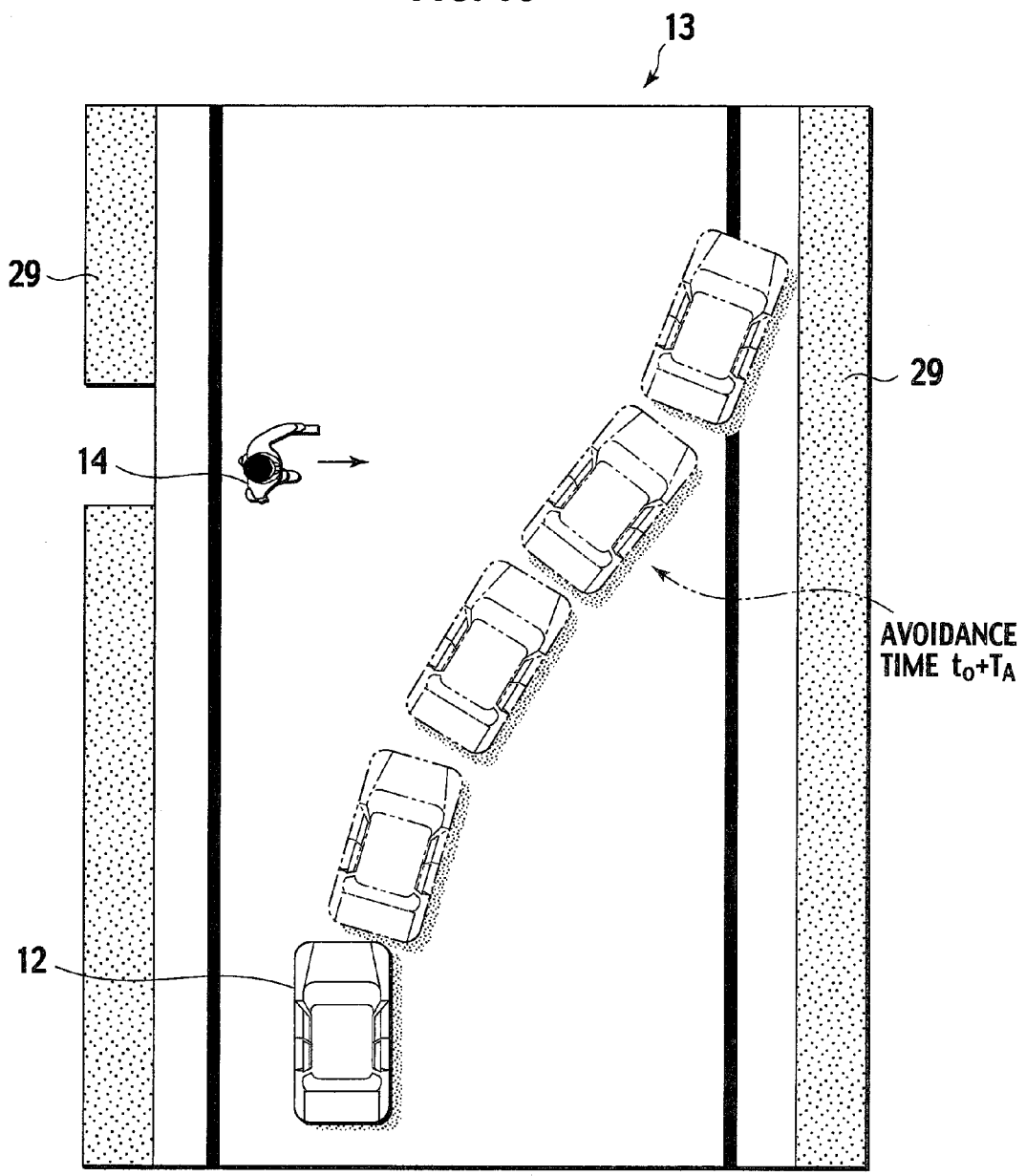
FIG. 10 is a plan view showing a movement locus of conventional avoidance of an obstacle, the avoidance considering only the obstacle.
Figure 11:
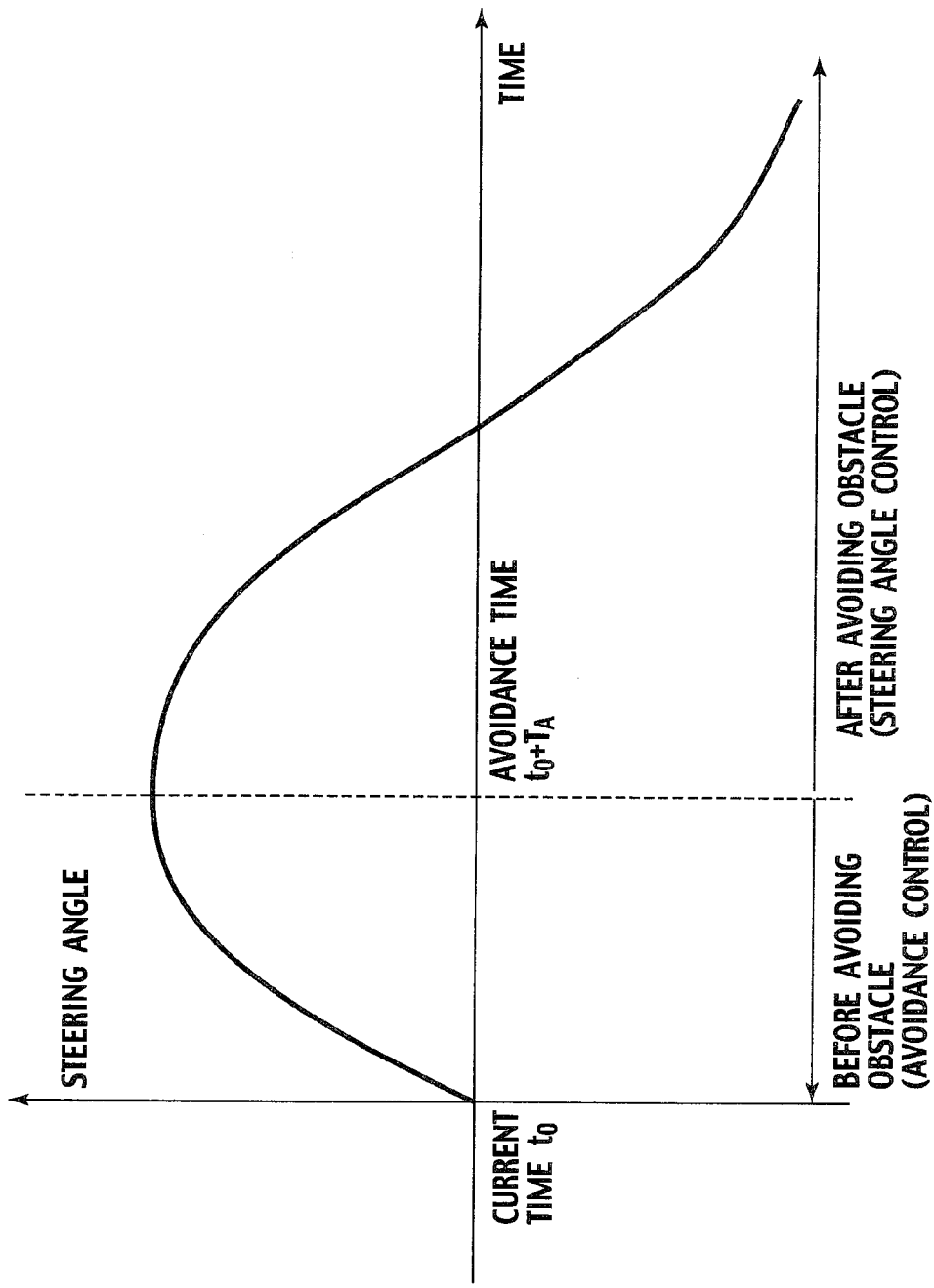
FIG. 11 is a graph showing a driving maneuver amount for the conventional avoidance of the obstacle, the avoidance considering only the obstacle.

In contrast, in a conventional device configured to calculate a driving maneuver amount by considering only an obstacle, there is a risk that a vehicle draws a movement locus as shown in FIG. 10. FIG. 10 shows the movement locus of obstacle avoidance by a conventional traveling safety device, and FIG. 11 is a graph showing driving maneuver amounts calculated by the conventional traveling safety device. Here, in FIG. 10, the vehicle 12 at the current time is indicated with a solid line, and the movement locus of the vehicle 12 from that point until the end of the avoidance are indicated with chain double-dashed lines. The conventional traveling safety device performs control that is targeted only for the obstacle avoidance until the obstacle 14 is avoided, and is therefore configured to set up the movement amount in the Y axis direction necessary for avoiding the obstacle 14 uniformly irrespective of the travelable range of the road. For this reason, as shown in FIG. 10, even if the avoidance of the obstacle 14 (the pedestrian) is successful at the time of avoidance, the attitude angle of the vehicle at the time of avoidance is considerably inclined relative to the direction of the road. A maneuver instruction to return to the front wheel steering angle is outputted in order to bring the considerably inclined attitude angle of the vehicle back to the original attitude after avoiding the obstacle (see FIG. 11). However, in the case where the movement amount in the Y axis direction necessary for avoiding the obstacle 14 is not calculated without considering the travelable range of the road as the scene shown in FIG. 3, there is a risk that the vehicle reaches the boundary section on the right side of the road before returning the attitude of the vehicle as shown in FIG. 10.

Second Embodiment

Based on the drawings in FIG. 12 to FIG. 16, description will be given of an avoidance maneuver calculation device 100 and an avoidance control device 110 including the avoidance maneuver calculation device 100, according to a second embodiment of the present invention.

Figure 12:
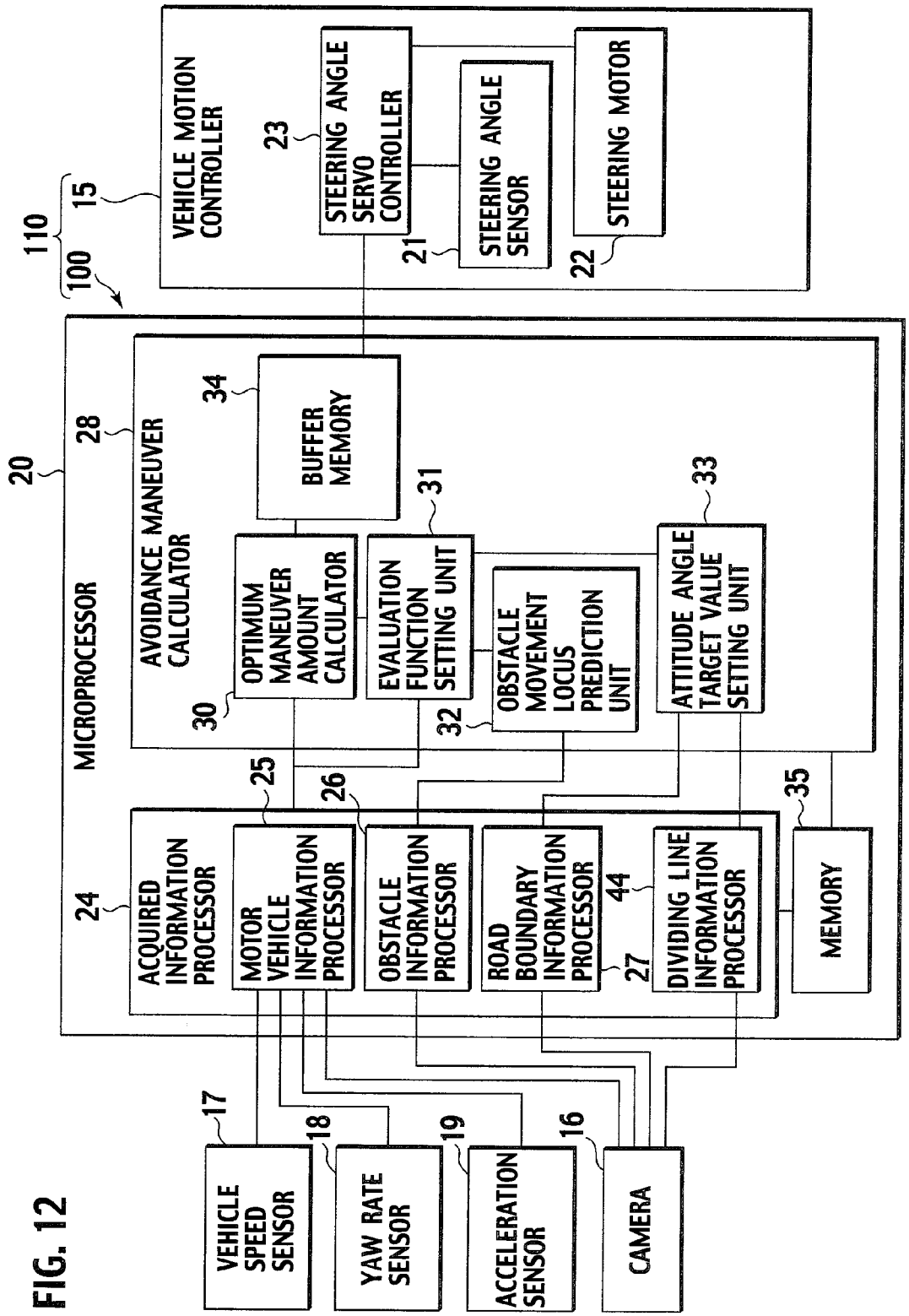
FIG. 12 is a block diagram showing another example of the avoidance control device according to the present invention.
Figure 13:
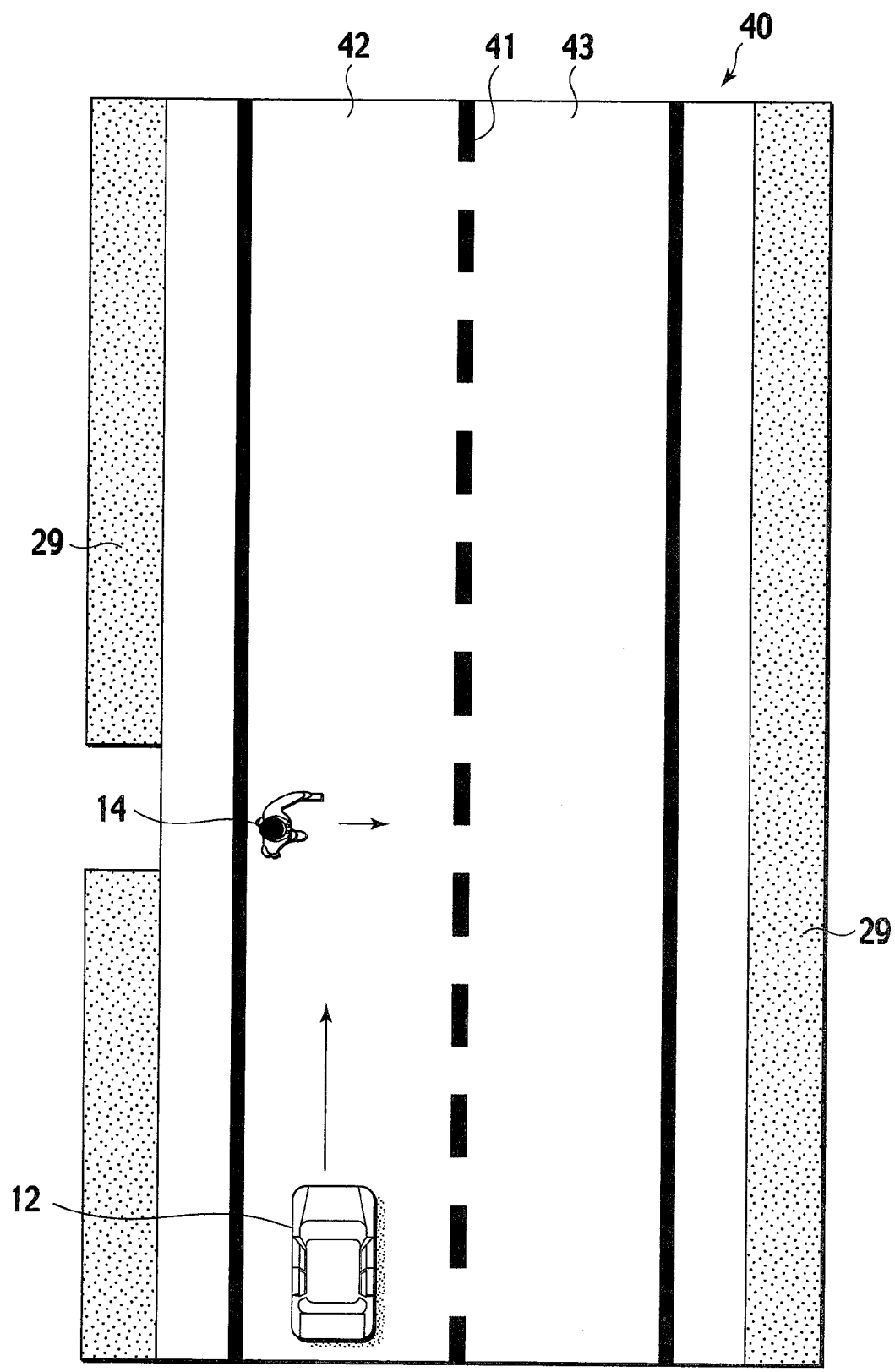
FIG. 13 is a schematic plan view showing a scene in which actual avoidance is executed, in a second embodiment.

In the second embodiment of the present invention, as shown in FIG. 13, a road 40 where the vehicle 12 is traveling is partitioned into two lanes 42 and 43 by drawing a lane dividing line 41, so that the lane 42 and the lane 43 allow the vehicle 12 to travel in opposite directions. Meanwhile, the avoidance maneuver calculation device 100 (see FIG. 12) of the second embodiment calculates the optimum driving maneuver amount which can deal with variation in the traveling speed of the obstacle 14 on the road 40. In the second embodiment, the lane dividing line 41 is a broken line to partition the road 40 into the lanes having the different traveling directions. Note that, however, it may be a line to partition the road into the lanes in the same direction or a line in a different color, or may be formed of a line other than the broken line, as long as the line is configured to partition the road into multiple lanes.

The avoidance maneuver calculation device 100 and the avoidance control device 110 including the avoidance maneuver calculation device 100 (see FIG. 12) of the second embodiment basically have the same configurations and operations as the avoidance maneuver calculation device 10 and the avoidance control device 11 including the avoidance maneuver calculation device 10 of the first embodiment. The same constituents are designated by the same reference numerals and detailed description thereof will be omitted. Likewise, detailed description of the same operations will be omitted.

As shown in FIG. 12, the acquired information processor 24 includes a dividing line information processor 44. The dividing line information processor 44 detects the lane dividing line 41 (see FIG. 13) of the road 13 by performing image processing of the image signals inputted from the pair of cameras 16. In this way, the dividing line information processor 44 functions as a dividing line detector in cooperation with the cameras 16.

The process for calculating the driving maneuver amount for avoiding the obstacle 14 is different from the first embodiment in terms of the method of setting up the attitude angle target value $\theta^*$ in Step S7 and the evaluation formula $\psi$ set up in Step S8. These different points will therefore be described below.

As shown in FIG. 13, the two lanes 42 and 43 partitioned by the lane dividing line 41 are opposed to each other, and the vehicle 12 is traveling on the lane 42. Therefore, the avoidance maneuver calculation device 100 calculates the driving maneuver amount further in consideration of returning the vehicle 12 back to the lane 42 after the vehicle 12 avoids the obstacle 14. For this reason, an evaluation item to require either to return the vehicle 12 back to the lane 42 or to orient the vehicle 12 to the returning direction is added to the evaluation formula $\psi$ at the evaluation ending time $(t_0+T)$ of the evaluation function J shown in the formula (14).

The request to return back to the original lane is expressed by an evaluation formula standing on the premise that it is favorable to bring the position of the vehicle 12 as close to the $Y=y_{LC}$ as possible at the evaluation ending time $(t_0+T)$, such as an evaluation formula of the following formula (24). Here, the coordinate in the center of the lane 42 (the original lane) on the left side is defined as $Y=y_{LC}$.

$$\psi_Y = (y - y_{LC})^2 / 2 \tag{24}$$

This formula (24) evaluates the state of attitude of the vehicle 12 determined by a target traveling position at the evaluation ending time $(t_0+T)$ (the position being equivalent to the lane 42 on the left side which is the original lane in this scene) and by a predicted position of accession of the automotive vehicle at the evaluation ending time $(t_0+T)$, the position calculated by use of the predicted traveling locus.

Figure 14:
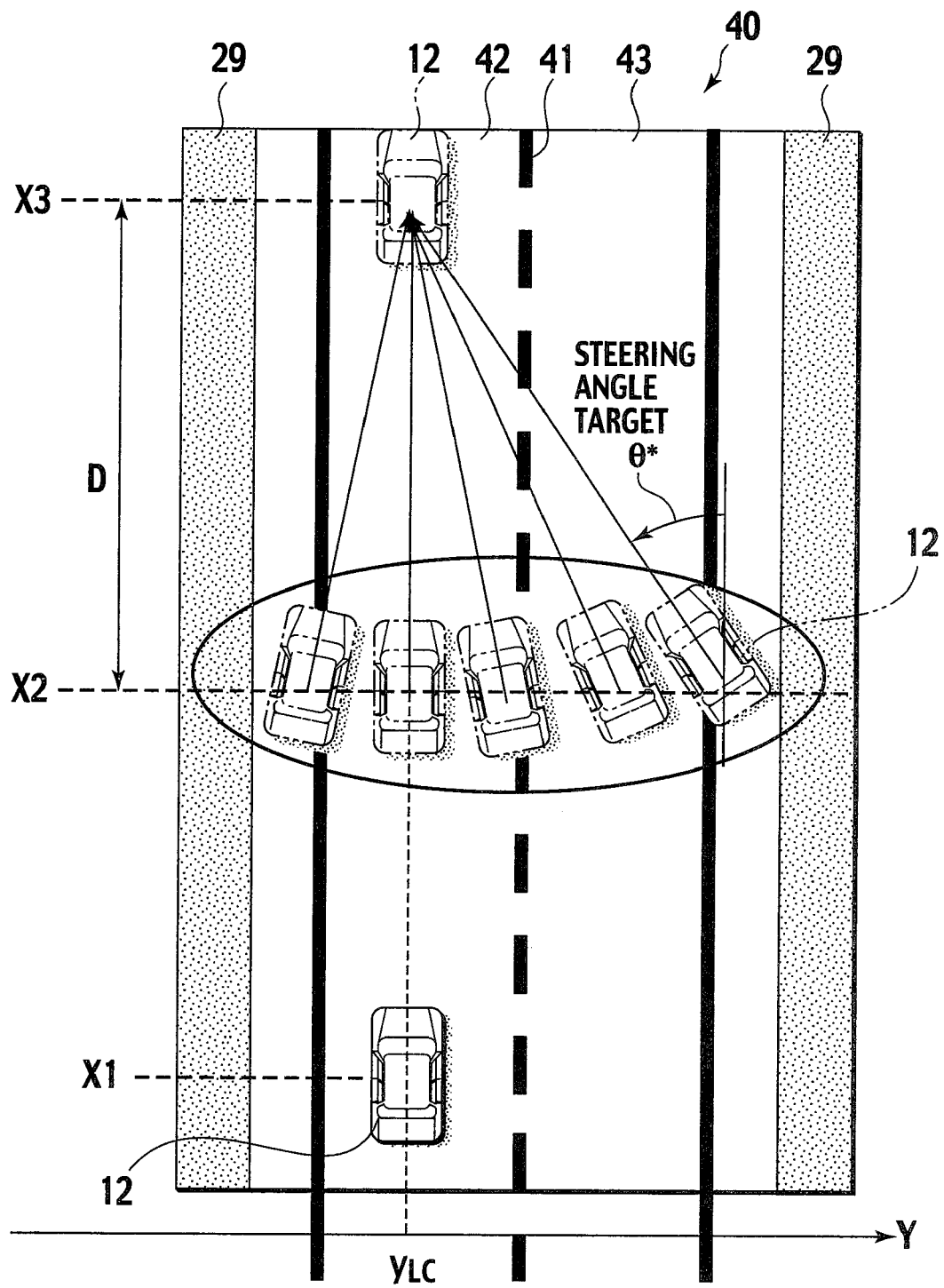
FIG. 14 is a plan view for explaining a method of setting an attitude angle target value in the second embodiment.

Meanwhile, as shown in FIG. 14, when setting up an attitude angle target value $\theta^{*\prime}$ in the direction to return to the lane 42 on the left side, the attitude angle target value $\theta^{*\prime}$ varies depending on the Y coordinate of the vehicle 12. Here, the vehicle 12 exists on a straight line X=X1 at the evaluation starting time $t_0$ and exists on a straight line X=X2 at the evaluation ending time $(t_0+T)$. The vehicle 12 is hypothetically located at a central part (coordinates $(X3, y_{LC})$) of the lane 42 further ahead of a predicted accession line of the automotive vehicle 12 at the evaluation ending time $(t_0+T)$ by a distance D (see the vehicle 12 drawn with a chain dot line). The attitude angle target value $\theta^{*\prime}$ is set up such that the attitude angle $\theta$ of the vehicle 12 at the evaluation ending time $(t_0+T)$ is oriented in the direction of the hypothetical vehicle 12. The attitude angle target value $\theta^{*\prime}$ is expressed by the following formula (25):

$$\theta^{*\prime} = \arctan\{(y - y_{LC})/D\} \tag{25}$$

The evaluation formula for evaluating the attitude angle is expressed by the formula (20). Therefore, the evaluation item $\psi$ is expressed by the following formula (26):

$$\psi = W_{yaw}\psi_{yaw} + W_Y\psi_Y \tag{26}$$

In this way, the attitude angle target value $\theta'$ is set up in Step S7, and the evaluation function J is set up in Step S8.

Moreover, as described previously, the obstacle information processor 26 detects information concerning the position and the movement of the obstacle 14 at a predetermined cycle $\Delta t$ to deal with the variation in the traveling speed of the obstacle 14. Based on the result of detection, the avoidance maneuver calculator 28 updates a calculation result of the optimum driving maneuver amount.

Here, if the evaluation period T calculated by using the formulae (21) and (22) in the first embodiment is also updated when the optimum driving maneuver amount is calculated at the predetermined cycle $\Delta t$, the evaluation period becomes shorter in accordance with the accession of the traveling vehicle 12 to the obstacle 14. As a consequence, the evaluation period after the avoidance may not be sufficiently secured, depending on the degree of accession of the vehicle 12 to the obstacle 14. For this reason, the avoidance maneuver calculation device 100 fixes the length T of the evaluation period set up at the time of initially starting the device, i.e. the value of the length T of the evaluation period from the evaluation starting time $t_0$ to the evaluation ending time $(t_0+T)$, until the avoidance of the obstacle 14 is completed.

Figure 16:
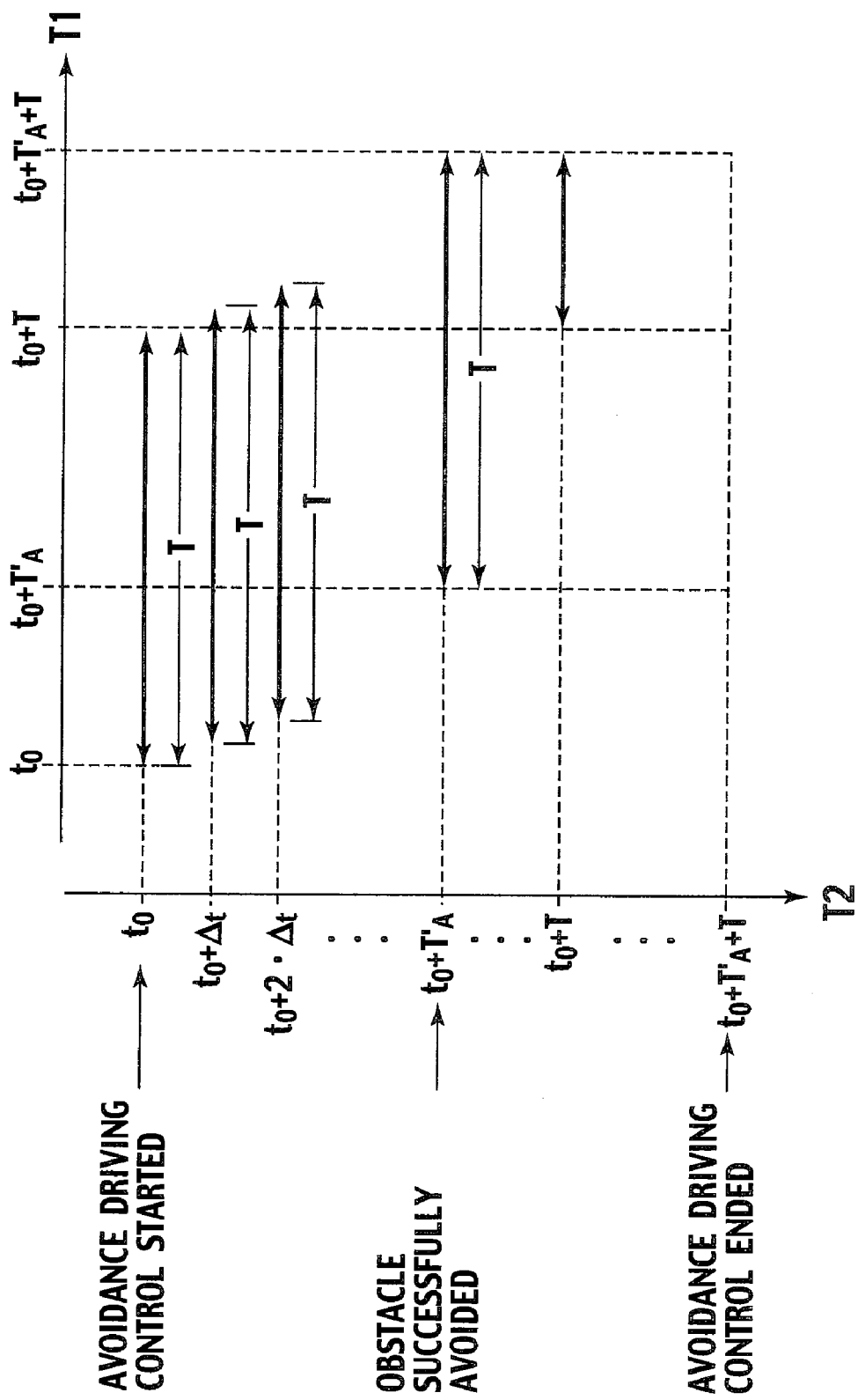
FIG. 16 is a graph explaining variations with time of generation intervals for the optimum driving maneuver amount and execution intervals of avoidance steering, i.e. execution intervals in the second embodiment of the present invention.
Figure 17:
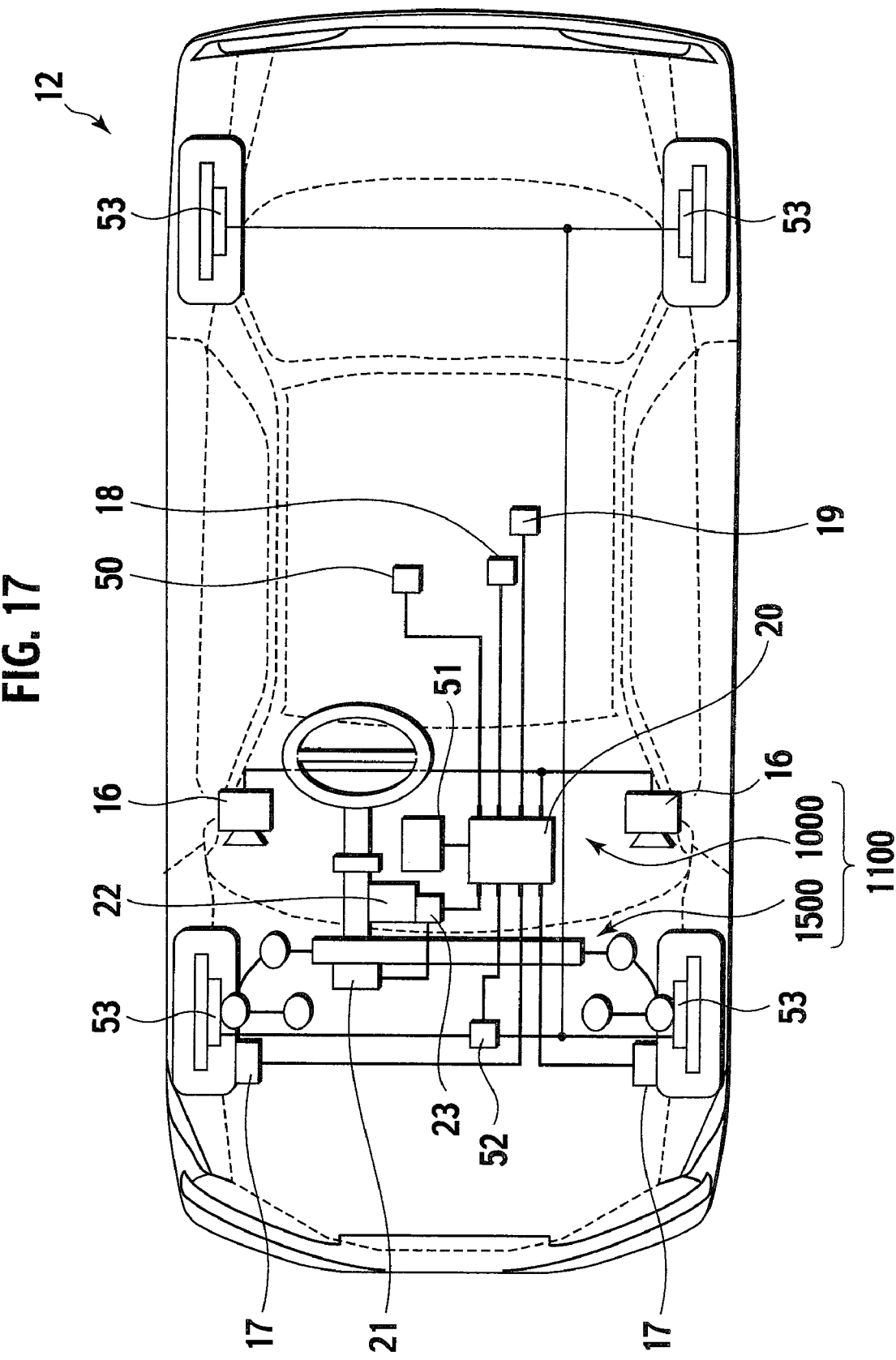
FIG. 17 is a plan view schematically showing another example of a vehicle employing the avoidance maneuver calculation device and the avoidance control device, according to the embodiment.

Moreover, the avoidance maneuver calculator 28 stores each data of the optimum driving maneuver amounts calculated at the predetermined cycle $\Delta t$ in the buffer memory 34, and discards previously stored data of the optimum driving maneuver amounts. The vehicle motion controller 15 performs steering corresponding to the data of the optimum driving maneuver amounts, i.e. the front wheel steering angles $\delta$, which are inputted to the buffer memory 34. Meanwhile, the previous data of the optimum driving maneuver amounts are discarded simultaneously with the input of the new data of the optimum driving maneuver amounts to the buffer memory 34. Therefore, the vehicle motion controller 15 always performs the steering based on the updated new data of the optimum driving maneuver amounts. The avoidance maneuver calculator 28 aborts calculation of the new optimum driving maneuver amounts upon a judgment that the obstacle 14 is avoided. Meanwhile, the vehicle motion controller 15 performs servo control until executing all the data of the time-series optimum driving maneuver amounts stored in the buffer memory 34. A graph in FIG. 16 shows the transition of execution period in which the calculation of the optimum driving maneuver amounts by the avoidance maneuver calculator 28 and the steering is performed based on the calculated optimum driving maneuver amounts. Time actually lapsed until the avoidance of the obstacle is indicated as $T_A'$. In FIG. 16, a longitudinal axis indicates an actual time flow T2 and a lateral axis indicates a length T1 of the execution period from the viewpoint of the actual time flow. Until a time point $(t_0+T_A')$, the execution period is shifted toward the future by an amount of time $\Delta t$ while keeping constant the value of the evaluation period having the length T along passages of the predetermined cycles $\Delta t$. Upon a judgment that the time reaches $(t_0+T_A')$, i.e. that the obstacle 14 is avoided, the avoidance maneuver calculator 28 stops the calculation of the optimum driving maneuver amounts and the updating of the data in the buffer memory 34. Accordingly, the execution period retains only the length T on the basis of $(t_0+T_A')$. For this reason, the execution period is reduced along the passage of time after the avoidance time $(t_0+T_A')$. All the optimum driving maneuver amounts are executed at evaluation ending time $(t_0+T_A')$, and the driving control for avoidance is terminated.

Figure 15:
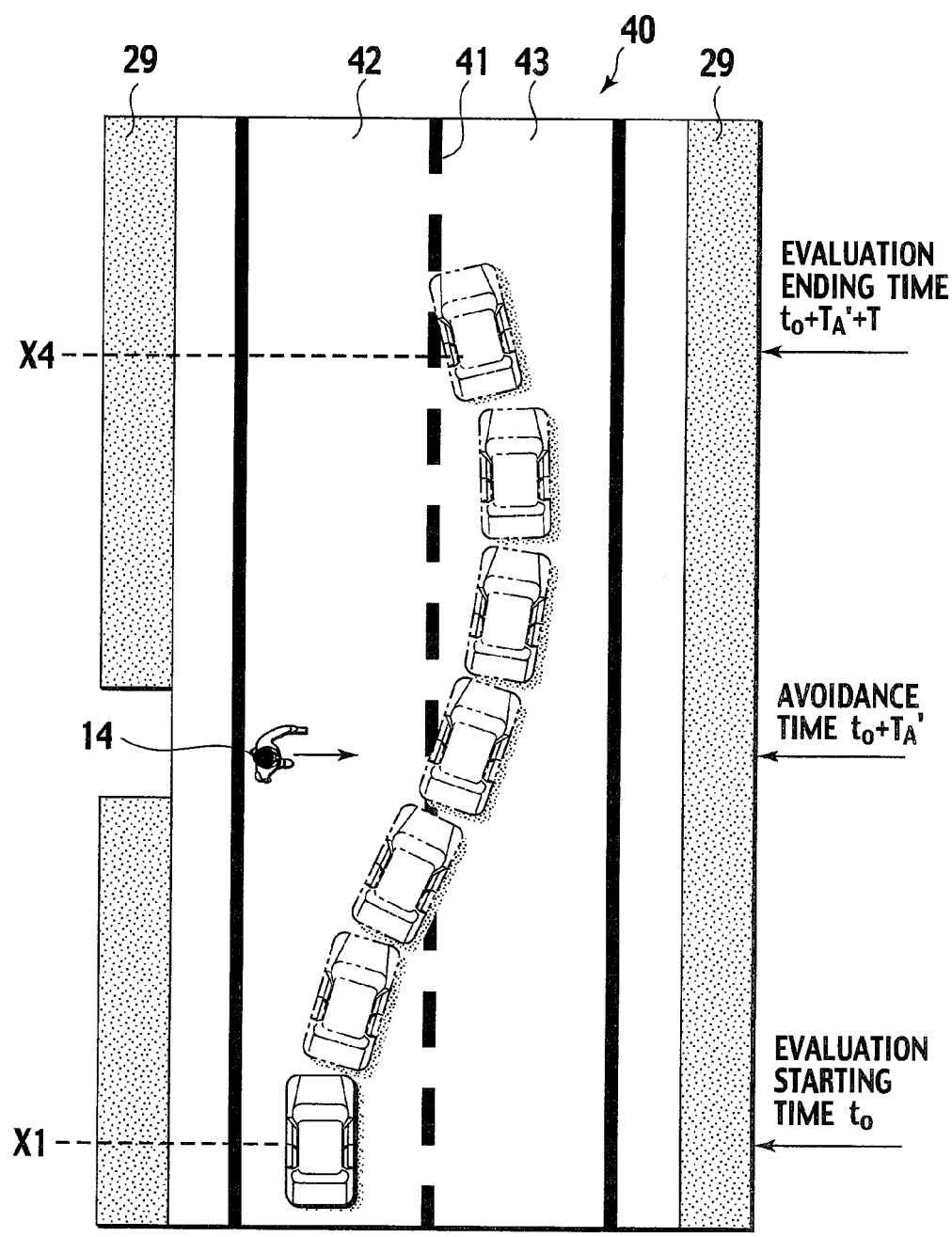
FIG. 15 is a plan view showing a movement locus of avoidance of an obstacle for a vehicle, the avoidance executed by the avoidance control device of the second embodiment.

FIG. 15 shows the movement locus of the vehicle 12, which is obtained by the avoidance control device 110 executing the optimum driving maneuver amounts calculated by the avoidance maneuver calculation device 100 as described above. Here, in FIG. 15, the vehicle 12 and the obstacle 14 at the current time to are indicated with solid lines while the movement loci of the vehicle 12 and the obstacle 14 from that point to the evaluation ending time $(t_0+T_A'+T)$ when the avoidance is completed are indicated with chain double-dashed lines. Here, the vehicle 12 exists on a straight line X=X1 at the evaluation starting time $t_0$ and exists on a straight line X=X4 at the evaluation ending time $(t_0+T_A'+T)$. The vehicle 12 is able to avoid the obstacle 14 and the boundary sections 29 of the road 40 and to orient the traveling direction thereof back to the direction toward the lane 42 where the vehicle was originally traveling.

The avoidance maneuver calculation device 100 and the avoidance control device 110 of the second embodiment are configured to calculate the optimum driving maneuver amounts until the vehicle 12 returns back to the lane 42 where the vehicle 12 was originally traveling or the optimum driving maneuver amounts until the traveling direction of the vehicle 12 is oriented back to the direction toward the lane, even in the case where the road 13 is partitioned into the two lanes 42 and 43 by the lane dividing line 41. Accordingly, it is possible to execute the avoidance of the obstacle 14 in accordance with the condition of the road 13.

Moreover, even when the obstacle 14 changes the traveling speed, the avoidance maneuver calculation device 100 and the avoidance control device 110 can calculate the optimum driving maneuver amounts corresponding to the traveling speed of the obstacle 14. Accordingly, it is possible to cause the vehicle 12 to avoid the obstacle 14.

Here, since the lane dividing line 41 partitions the road 40 into the two lanes 42 and 43 opposed to each other in the second embodiment, the avoidance maneuver calculation device 100 calculates the optimum driving maneuver amounts for drawing the movement locus that allows the vehicle 12 to return to the original traveling lane (which is the lane 42 in the second embodiment). However, the invention is not limited only to this configuration. For example, even if the road is partitioned into two lanes by a lane dividing line, the vehicle 12 can travel on the lane parallel to the original lane instead of the original lane at the time of the evaluation ending time after avoiding the obstacle when both of the lanes permit the vehicle to travel in the same direction. In this case, the evaluation formula $\psi$ is expressed by the following formula (24'). Here, the coordinate in the center of the lane parallel to the original traveling lane is defined as $Y=y_{LC2}$.

$$\psi=W_Y(y-y_{LC2})^2/2 \tag{24'}$$

Third Embodiment

Based on the drawings in FIGS. 17 to 21, description will be given of an avoidance maneuver calculation device 1000 and an avoidance control device 1100 including the avoidance maneuver calculation device 1000, according to a third embodiment of the present invention.

The avoidance maneuver calculation device 1000 and the avoidance control device 1100 including the avoidance maneuver calculation device 1000 (see FIG. 18) of the third embodiment basically have the same configurations and operations as the avoidance maneuver calculation device 10 and the avoidance control device 11 including the avoidance maneuver calculation device 10 of the first embodiment. The same constituents are designated by the same reference numerals and detailed description thereof will be omitted. Likewise, detailed description of the same operations will be omitted.

In the third embodiment, the avoidance maneuver calculation device 1000 includes a GPS signal receiving device 50 and a road information recording device 51, while a vehicle motion controller 1500 (see FIG. 18) includes a brake controller 52 and brake actuators 53.

The GPS signal receiving device 50 receives GPS (global positioning system) signals transmitted from artificial satellites in order to detect a traveling position of the vehicle 12.

The road information recording device 51 is formed of an electronic recording medium such as a CD-ROM, a DVD-ROM or a hard disk and of a reader device therefor, and road map information is stored in the recording medium. The GPS signal receiving device 50 and the road information recording device 51 are electrically connected to the microprocessor 20.

The brake actuators 53 are respectively provided on the four wheels of the vehicle 12, and each brake actuator 53 performs braking operation on a corresponding one of the four wheels. Each brake actuator 53 is electrically connected to the brake controller 52, and this brake controller 52 is electrically connected to the microprocessor 20. The brake controller 52 calculates braking forces respectively for the four wheels of the vehicle 12, the braking forces being necessary for executing the optimum driving maneuver amounts calculated by the avoidance maneuver calculator 28. The brake controller 52 outputs driving signals corresponding to the calculated braking forces to the brake actuators 53. In this way, the brake controller 52 is able to decelerate the vehicle 12 and provide a difference in the braking forces between the right and left wheels. As a result, the brake controller 52 can generate a yaw moment in the vehicle 12.

Figure 18:
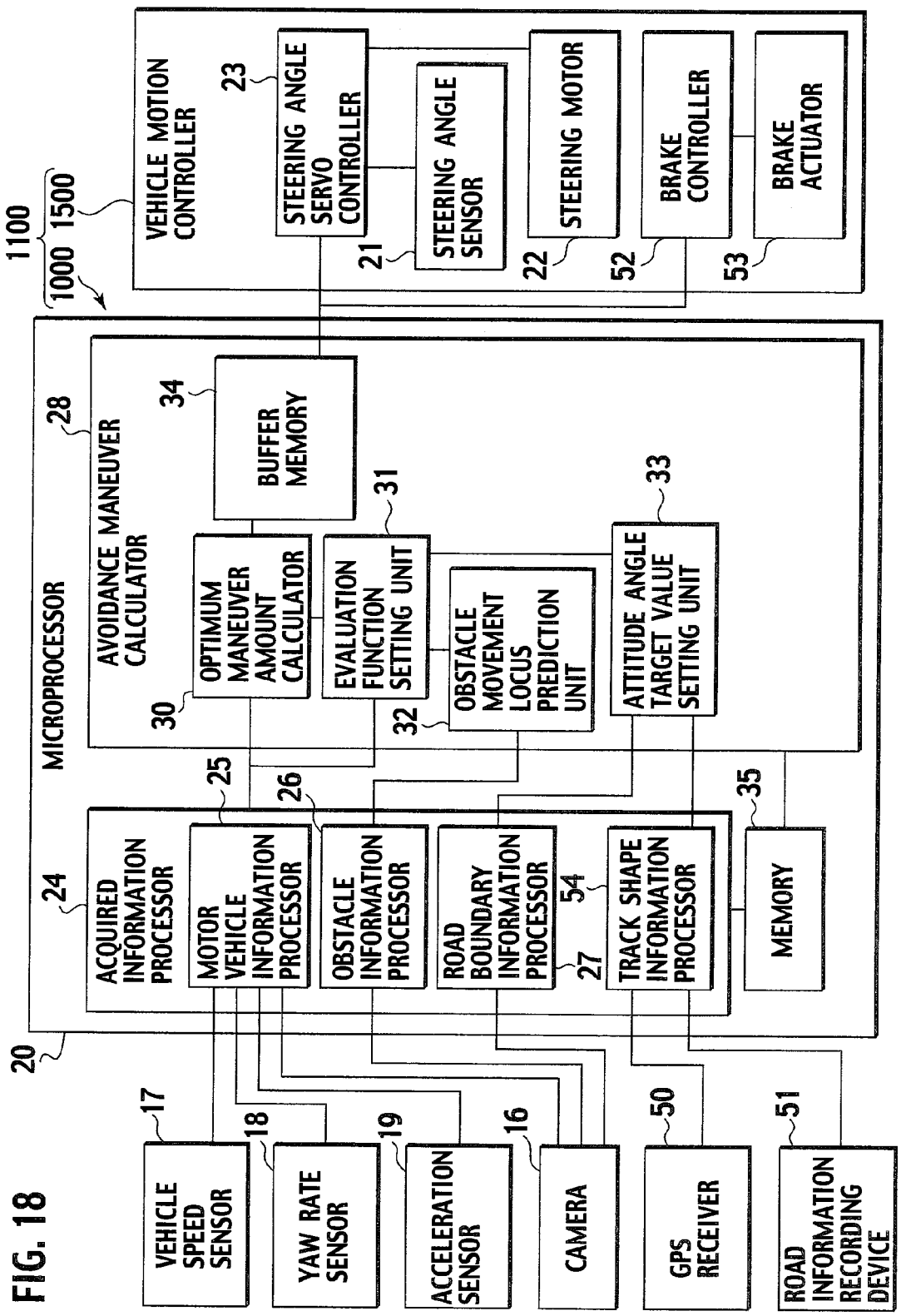
FIG. 18 is a block diagram showing another example of the avoidance control device according to the embodiment.

A block diagram of the above-described device configurations is shown in FIG. 18. Unlike the first embodiment, the acquired information processor 24 includes a track shape information processor 54 to which signals from the GPS signal receiving device 50 and the road information recording device 51 are inputted. The track shape information processor 54 is able to obtain information on a track shape of the road 13 in front of the vehicle 12 by performing map matching between the position of the vehicle 12 calculated based on the GPS signals received from the GPS signal receiving device 50 and the road map information obtained from the road information recording device 51. Here, the track shape of the road 13 means a direction along an extending direction of the road 13. When the road 13 is curved, the track shape means the extending direction of the road 13, i.e. a direction of the tangent to the curve. In this way, the track shape information processor 54 functions as a track shape information acquisition unit in cooperation with the GPS signal receiving device 50 and the road information recording device 51.

Figure 19:
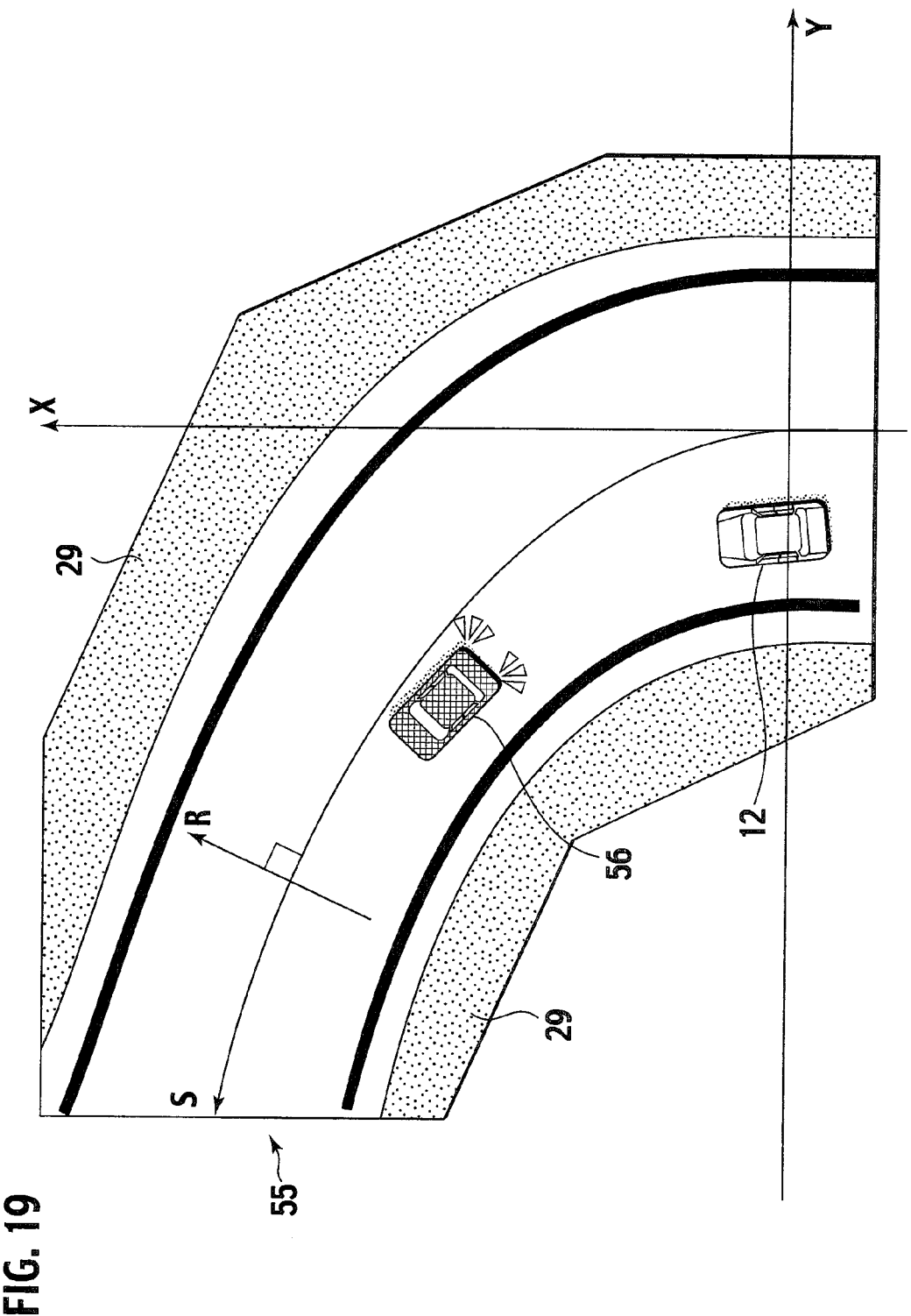
FIG. 19 is a schematic plan view showing the scene, in which actual avoidance is executed, in the second embodiment, and is the view for explaining a method of setting a coordinate system.

In the third embodiment, as shown in FIG. 19, a road 55 where the vehicle 12 is traveling is curved, and a second vehicle (an obstacle 56) is stopped at this curved section. As is similar to the first embodiment, both sides of the road 55 are partitioned by fences (the boundary sections 29) and a space between the boundary sections 29 is defined as the travelable range for the vehicle 12.

Next, description will be given of the process to calculate the driving maneuver amount by the avoidance maneuver calculation device 1000, the description covering only different points from those in the avoidance maneuver calculation device 10 of the first embodiment.

In Step S1, the track shape information processor 54 performs the map matching process based on the information from the GPS signal receiving device 50 and the road information recording device 51, and acquires the information concerning the position on the road 55 of the vehicle 12 and the track shape of the road 55.

The setup of the coordinate system in Step S3 is also different from that in the first embodiment. First, the X axis and the Y axis are set up as an orthogonal coordinate system, as similar to the first embodiment. In addition to these axes, as shown in FIG. 19, the avoidance maneuver calculation device 1000 of the third embodiment sets up an S coordinate axis constituting a center line of the road 55 and an R coordinate axis which is orthogonal to the S coordinate axis. The center line of the road 55 is obtained from data in the road information recording device 51. Accordingly, conversion formulae between the X,Y coordinates and the S,R coordinates are expressed by the following formulae (27) and (28), respectively:

(Expressions 7)

$$\begin{pmatrix} X \\ Y \end{pmatrix} = \begin{pmatrix} g_x(s, r) \\ g_y(s, r) \end{pmatrix} \quad (27)$$

$$\begin{pmatrix} S \\ R \end{pmatrix} = \begin{pmatrix} h_s(X, Y) \\ h_r(X, Y) \end{pmatrix} \quad (28)$$

The calculation of the value of the state vector x constituting the vehicle movement model in Step S4 is also different from that in the first embodiment. Since the avoidance maneuver calculation device 1000 and the avoidance control device 1100 of the third embodiment execute control of the braking forces in addition to the front wheel steering angle δ, the maneuver amounts are increased to three factors: the front wheel steering angle δ, vehicle deceleration a, and a lateral braking force difference d. The vehicle movement model corresponding to the increase in the types of the maneuver amounts includes the following formulae:

$$x' = v \cos(\beta + \theta) \quad (29)$$

$$y' = v \sin(\beta + \theta) \quad (30)$$

$$\theta' = \gamma \quad (31)$$

$$v' = d \quad (32)$$

$$\beta' = -\gamma + 2\{Y_f(\beta_f) + Y_r(\beta_r)\}/mv \quad (33)$$

$$\gamma' = 2l_f Y_f(\beta_f)/I - 2l_r Y_r(\beta_r)/I + 2l_t d/I \quad (34)$$

Here, the code $l_t$ denotes a tread width, and other codes represent the same as those in the first embodiment. The state vector x is the same as that in the first embodiment, so that the state vector value is calculated as similar to the first embodiment.

In the third embodiment, since the obstacle 56 remains stationary, only the position $(x_p, y_p)$ of the obstacle 56 is calculated whereas the movement locus prediction process is not carried out (Step S5).

Figure 20:
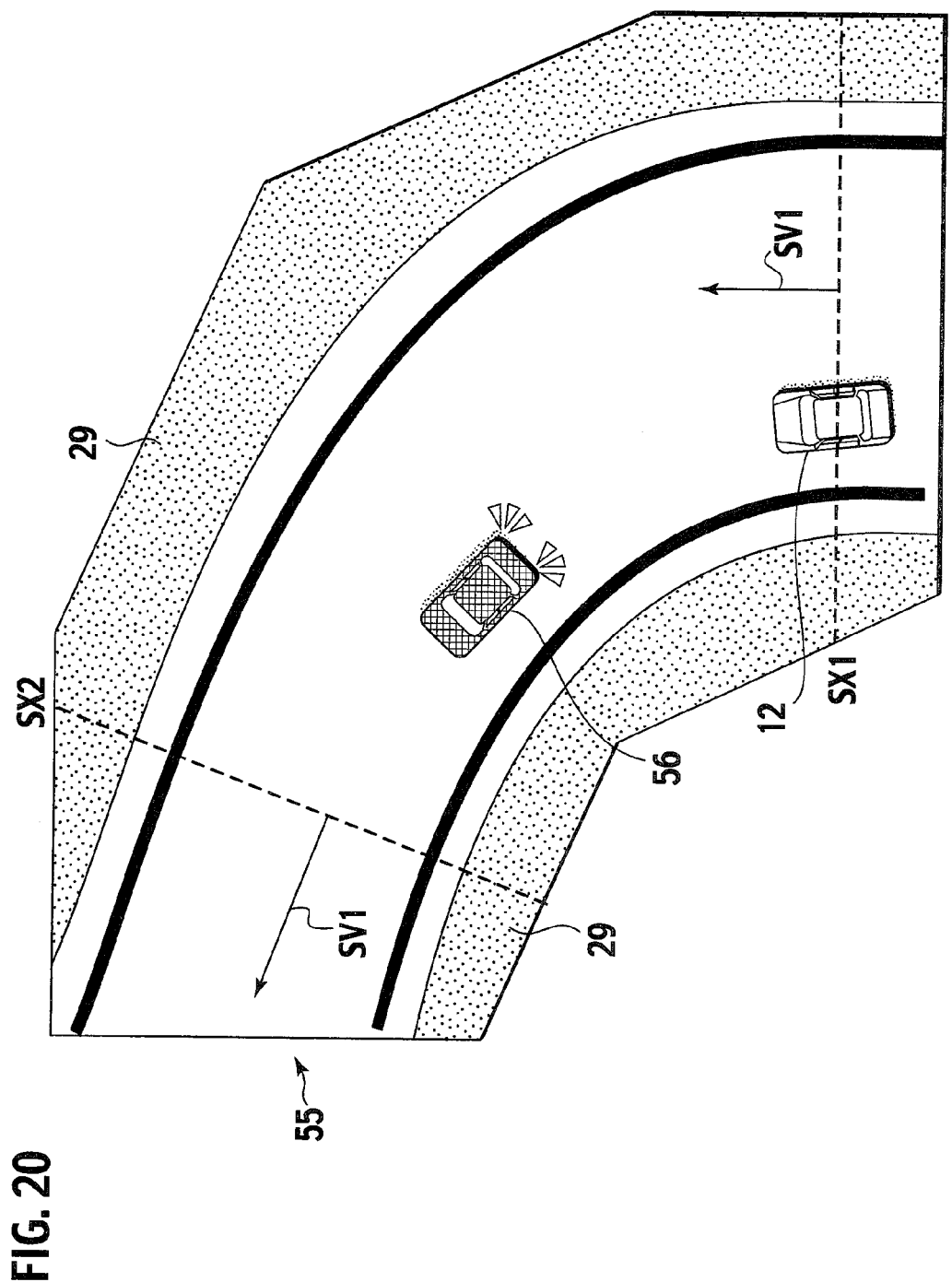
FIG. 20 is a plan view for explaining the method of setting the attitude angle target value in a scene assumed in a third embodiment.

In Step S6, the attitude angle target value θ* (=0) is set up along the direction of the road 55 at a predicted point of accession of the automotive vehicle as shown in FIG. 20. Here, the vehicle 12 exists on a straight line S=SX1 at the evaluation starting time $t_0$ and exists on a straight line S=SX2 at the evaluation ending time $(t_0+T)$. An arrow SV1 indicates the direction of the road 55.

Moreover, the following required items are added to the evaluation formula L of the formula (14) in the first embodiment.

Required item 4: Excessive deceleration is not carried out (harsh braking is not carried out).

Required item 5: The lateral braking force difference is not made large.

Required item 6: The vehicle speed suitable for the track shape of the road is applied (so as not to travel at a vehicle speed equal to or faster than the vehicle speed suitable for passing the curved section of the road).

The required item 4 and the required item 5 indicate the state of maneuver of the driving maneuver made on the vehicle 12. The required item 4 is expressed by the following formula (35), and the required item 5 is expressed by the following formula (36):

$$L_A = a^2/2 \quad (35)$$

$$L_D = d^2/2 \quad (36)$$

The required item 6 is expressed by the following evaluation formula:

$$L_V = (v - v^*)^2/2 \quad (37).$$

A target vehicle speed v* is determined in accordance with the following procedures.

First, a curvature radius of the road 55 in front of the vehicle 12 is read out of the data in the road information recording device 51, and a minimum value of the curvature radius is calculated within a range from the position of the vehicle 12 at the evaluation starting time $t_0$ to a predicted point of accession of the automotive vehicle where the vehicle 12 is predicted to reach at the evaluation ending time $(t_0+T)$. The value is defined as $\rho_{min}$.

Next, reference is made to an upper value $a_y^{max}$ of predetermined vehicle lateral acceleration, and a vehicle speed $v_{max}$ at the time of passing the road 55 having the curvature radius $\rho_{min}$ at the lateral acceleration $a_y^{max}$ is calculated by using the following formula (38):

$$v_{max} = (a_y^{max} \rho_{min})^{1/2} \quad (38)$$

Moreover, a current vehicle speed v(f) is compared with $v_{max}$, and the smaller value is defined as a value v*.

Accordingly, the formula (37) evaluates the state of attitude of the vehicle 12 which is derived from the vehicle speed $v_{max}$ suitable for the curved section of the road 55 and the speed of the vehicle 12 passing the curved section.

At the curved section of the road as shown in FIG. 19, a distance from the center of the road is expressed by use of the R coordinate instead of the Y coordinate. Therefore, the required item 2 is expressed by the following formula (39):

(Expressions 8)

$$L_R(r) = \begin{cases} \frac{1}{2}(r - r_L - \Delta)^2 & \wedge \quad r \le r_L + \Delta \\ 0 & \wedge \quad r_L + \Delta < r < r_R - \Delta \\ \frac{1}{2}(r - r_R - \Delta)^2 & \wedge \quad r \ge r_R - \Delta \end{cases} \quad (39)$$

Here, the value $r_L$ is an R coordinate value of a left end of the road 55 (a left end of the travelable range), while the value $r_R$ is an R coordinate value of a right end of the road 55 (a right end of the travelable range).

By substituting the conversion formula $r=h_r(x,y)$ in the formula (28) to r in the formula (39), it is possible to obtain a formula $L_R(x,y)$ that expresses $L_R$ by using the X and Y coordinates. This formula is used as the evaluation formula.

Therefore, the evaluation formula L is formed as below:

$$L = W_P L_P + W_R L_R + W_F L_F + W_A L_A + W_D L_D + W_V L_V \quad (40)$$

Note that values $W_A$, $W_D$, and $W_v$ are weights to the respective required items 4, 5, and 6. Here, the evaluation formula ψ is expressed by the formulae (19) and (20) as similar to the first embodiment.

The optimum maneuver amount calculator 30 calculates optimum driving maneuver amounts in three types (41), (42), and (43) listed below as the optimum driving maneuver amounts (Step S9):

(Expressions 9)

$$\delta^* = \left( \delta(t_0) \; \delta\left(t_0 + \frac{T}{N}\right) \; \delta\left(t_0 + \frac{2T}{N}\right) \wedge \; \delta\left(t_0 + \frac{N-1}{N}T\right) \right) \quad (41)$$

$$a^* = \left( a(t_0) \; a\left(t_0 + \frac{T}{N}\right) \; a\left(t_0 + \frac{2T}{N}\right) \wedge \; a\left(t_0 + \frac{N-1}{N}T\right) \right) \quad (42)$$

$$d^* = \left( d(t_0) \; d\left(t_0 + \frac{T}{N}\right) \; d\left(t_0 + \frac{2T}{N}\right) \wedge \; d\left(t_0 + \frac{N-1}{N}T\right) \right) \quad (43)$$

Despite the increase in the number of the maneuver amounts to be calculated, the algorithm for optimization is the same as that in the first embodiment.

In addition to the front wheel steering angle δ*, a vehicle deceleration a* and a lateral braking force difference d* are stored in the buffer memory 34 as the optimum driving maneuver amounts (Step S10).

FIG. 21 shows the movement locus of the vehicle 12, which is obtained by the avoidance control device 1100 executing the optimum driving maneuver amounts calculated by the avoidance maneuver calculation device 1000 as described above. Here, in FIG. 21, the vehicle 12 at the evaluation starting time $t_0$ is indicated with a solid line while the movement locus of the vehicle 12 from that point to the evaluation ending time ($t_0$+T) when the avoidance is completed is indicated with chain double-dashed lines. As shown in FIG. 21, the vehicle 12 can avoid the obstacle 14 and the boundary sections 29 of the road 55 and to align its traveling direction with the direction of the road 55.

The track shape information acquisition unit, which includes the GPS signal receiving unit 50, the road information recording device 51, and the track shape information processor 54, is able to detect the track shape of the road 55, while the avoidance maneuver calculator 28 calculates the optimum driving maneuver amounts. Therefore, the avoidance maneuver calculation device 1000 can calculate the optimum driving maneuver amounts irrespective of the track shape of the road 55. The optimum driving maneuver amounts enable the vehicle to avoid the obstacle 56 and the boundary sections 29 of the road 55, to align its traveling direction with the direction of the road 55 after completing the avoidance of the obstacle 56, and to locate its traveling position at an appropriate position within the travelable range of the road 55.

The steering angle servo controller 23 performs the servo control, based on the front wheel steering angle δ*, and the brake controller 52 performs the servo control, based on the vehicle deceleration a* and the lateral braking force difference d*. In this way, the vehicle is able to avoid the obstacle 56 and the boundary sections 29 of the road 55, to align its traveling direction with the direction of the road 55 after completing the avoidance of the obstacle 56, and to locate its traveling position at the appropriate position within the travelable range of the road 55.

Therefore, the avoidance operation calculation device according to the embodiment can calculate the driving maneuver amounts that allow the automotive vehicle to avoid the obstacle within the travelable range of the road. Specifically, the vehicle condition of the automotive vehicle to be evaluated by the evaluation function includes the state of accession of the automotive vehicle relative to the boundary sections of the road at each time point, in addition to the state of accession of the automotive vehicle relative to the obstacle at each time point in the period from the evaluation starting time to the evaluation ending time and the state of attitude of the automotive vehicle relative to the obstacle which is determined by the target attitude angle and the predicted attitude angle at the evaluation ending time. The avoidance maneuver calculation device calculates the possible optimum driving maneuver amounts made on the automotive vehicle based on the predicted traveling locus that corresponds to the minimum value of this evaluation function. Therefore, the avoidance maneuver calculation device can calculate the driving maneuver amounts that enable the automotive vehicle to avoid the obstacle within the width range, i.e. the travelable range of the road and to allow its attitude after the avoidance to correspond to the road. For this reason, even when the fences are provided on both sides of the road, the avoidance maneuver calculation device can calculate the driving maneuver amounts that enable the automotive vehicle to avoid the obstacle and to return to the path taken before the avoidance without coming too close to the end of the road after the avoidance.

Meanwhile, the avoidance control device according to the present invention is able to perform the steering necessary for causing the vehicle to avoid the obstacle within the travelable range of the road. For this reason, it is possible to reduce a burden for, as well as a discomfort in, performing the steering to avoid the obstacle, as compared to the case of performing the steering only for the avoidance. Further, the automotive vehicle can avoid the obstacle within the travelable range of the road.

Each of the detectors and the vehicle motion controllers used in the avoidance maneuver calculation devices and to the avoidance control devices of the above-described embodiments can be shared with other driving assistance devices employed in the vehicle. For example, the lane dividing line detector, the controller in the steering mechanism, and the controller in a braking mechanism can be shared with a lane keeping mechanism. The lane dividing line detector and the controller in the braking mechanism can be shared with an automatic tracking mechanism, and the track shape information acquisition unit can be shared with a navigation system.

In the above-described embodiment, the maneuver amount for avoiding the obstacle is calculated while considering the boundary sections of the road in addition to the obstacle. Accordingly, by using this maneuver amount, the automotive vehicle can avoid the obstacle within the width, i.e. the travelable range of the road. In the above-described embodiment, even when the fences are provided on both sides of the road, for example, it is possible to calculate the driving maneuver amounts that enable the automotive vehicle to avoid the obstacle and to return to the path taken before the avoidance without coming too close to the end of the road after the avoidance.

In the above-described embodiment, the evaluation function is formed by considering not only the degree of accession to the obstacle but also the degree of accession to the boundary sections of the road and the vehicle attitude angle after avoiding the obstacle. Specifically, in the above-described embodiment, the optimum driving maneuver amounts are calculated by considering the step before the automotive vehicle actually avoids the obstacle and how the automotive vehicle is supposed to travel after avoiding the obstacle. Therefore, in the above-described embodiment, it is possible to calculate the optimum driving maneuver amounts for avoiding the obstacle and for preventing traveling off the road at the same time.

In the above-described embodiment, the optimum driving maneuver amounts are calculated with the movement locus of the moving obstacle predicted in advance. Accordingly, it is possible to calculate the optimum driving maneuver amounts that are effective regardless of whether the obstacle is stationary or moving.

In the above-described embodiment, it is possible to calculate the optimum driving maneuver amounts corresponding to more detailed driving targets by setting the target value concerning not only the vehicle attitude angle after avoiding the obstacle but also the position of accession of the vehicle. Therefore, in the above-described embodiment, it is possible to increase options for the traveling condition of the vehicle after the avoidance.

In the above-described embodiment, the lanes of the road are judged based on the information concerning the lane dividing line on the road. In the above-described embodiment, the optimum driving maneuver amounts are calculated based on this judgment so that the traveling direction of the automotive vehicle is oriented in the direction bringing the automotive vehicle back to the lane where the automotive vehicle was originally traveling. Therefore, in the above-described embodiment, it is possible to calculate the optimum driving maneuver amounts that correspond to the road provided with multiple lanes.

In the above-described embodiment, the lanes on the road are judged based on the information concerning the lane dividing line on the road. In the above-described embodiment, the optimum driving maneuver amounts are calculated based on this judgment so that the traveling direction of the automotive vehicle is oriented in the direction bringing the automotive vehicle back to the lane parallel to the lane where the automotive vehicle was originally traveling. Therefore, in the above-described embodiment, it is possible to calculate the optimum driving maneuver amounts that correspond to the road provided with multiple lanes.

In the above-described embodiment, the information concerning the road ahead in the traveling direction is acquired and the vehicle maneuver amounts are calculated so as to enable the automotive vehicle to resume driving along the direction of the road promptly after avoiding the obstacle. For this reason, in the above-described embodiment, it is possible to calculate the optimum driving maneuver amounts corresponding to the track shape of the road even if this road is curved.

In the above-described embodiment, the optimum driving maneuver amounts are updated based on the new information at a cycle of a predetermined time period. Accordingly, even if the obstacle displays a behavior which was not originally expected, it is possible to calculate the appropriate optimum driving maneuver amounts corresponding to the actual behavior of the obstacle.

In the above-described embodiment, it possible to calculate the optimum driving maneuver amounts while considering the driving maneuver executed by the driver. Accordingly, it is possible to avoid abrupt steering or harsh braking, for example.

In the above-described embodiment, the driving maneuver is performed so as to meet the calculated optimum driving maneuver amounts. Accordingly, it is possible to perform the driving maneuver equivalent to the optimum driving maneuver amounts without relying on the maneuver by the driver.

In the above-described embodiment, it is possible to calculate the optimum driving maneuver amounts that allow the automotive vehicle to avoid the obstacle within the travelable range of the road.

In the above-described embodiment, the automotive vehicle can avoid the obstacle within the travelable range of the road.

The embodiments described above are configured to execute the steering of the vehicle by the vehicle motion controller, based on the optimum driving maneuver amounts calculated by the avoidance maneuver calculation device. However, note that the steering of the vehicle by the vehicle motion controller may be carried out so as to assist the driving maneuver performed by the driver. In this case, for example, the vehicle motion controller may be configured to perform the steering in response to a difference between the optimum driving maneuver amounts and the driving maneuver performed by the driver, or may be configured to abort the steering not performed by the driver when the driver performs the driving maneuver.

Moreover, the embodiments described above are configured to employ the avoidance control device including the avoidance maneuver calculation device and to execute the steering of the vehicle by use of the vehicle motion controller, based on the calculated optimum driving maneuver amounts. However, it is also possible to employ a configuration not to perform the steering of the vehicle. In this case, for example, only the avoidance maneuver calculation device is mounted on the vehicle while a display is disposed in the vehicle interior, so that the movement locus for the avoidance in compliance with the optimum driving maneuver amounts is indicated on the display. In this way, the steering for avoiding the obstacle is assisted.

In the embodiments described above, the avoidance maneuver calculation device and the avoidance control device have different configurations. However, it is possible to combine the configurations as appropriate. To be more precise, the second embodiment includes the lane dividing line detector and adopts the calculation method corresponding to the variation in the traveling speed of the obstacle. The third embodiment includes the track shape information acquisition unit and performs the control of the braking mechanism. These configurations, methods, and the like are applicable to the avoidance maneuver calculation device and the avoidance control device of the first embodiment when appropriate.

Moreover, in the embodiments described above, the avoidance maneuver calculation device performs the steering based on the front wheel steering angle δ being the calculated optimum driving maneuver amount. However, depending on the calculated optimum driving maneuver amounts, it is also possible to control only the braking mechanism.

INDUSTRIAL APPLICABILITY

The present invention is utilized in the automobile industry.

The invention claimed is:

1. An avoidance maneuver calculation device comprising:
a road boundary detector configured to detect a road located ahead of an automotive vehicle and on which the automotive vehicle is traveling, and a boundary section of the road;
an obstacle detector configured to detect an obstacle existing on the road ahead of the automotive vehicle;
an automotive vehicle information detector configured to detect an attitude angle formed by a traveling direction of the automotive vehicle with respect to a direction of the road, a position of the automotive vehicle on the road, and a speed of the automotive vehicle; and
an avoidance maneuver calculator configured to calculate an optimum maneuver amount for avoiding the obstacle on the road, based on detection information from the detectors, wherein the avoidance maneuver calculator comprises:
an attitude angle target value setting unit configured to set, as a target attitude angle, a target of an attitude angle at a time after the automotive vehicle avoids and passes the obstacle, wherein the target attitude angle is set according to a location on the road where the automotive vehicle is predicted to reach after the automotive vehicle avoids and passes the obstacle,
an evaluation function setting unit configured to set up an evaluation function that evaluates a plurality of predicted traveling loci of the automotive vehicle corresponding to a plurality of possible maneuver amounts, the evaluation function evaluating a vehicle condition in the plurality of predicted traveling loci, wherein the evaluation of the vehicle condition is based at least on a state of attitude of the automotive vehicle calculated using (i) the target attitude angle, and (ii) a plurality of predicted attitude angles that are the attitude angles that the automotive vehicle on the plurality of predicted traveling loci is predicted to have at the time after the automotive vehicle avoids and passes the obstacle, and
an optimum maneuver amount calculator configured to calculate the optimum maneuver amount based on a minimum value obtained from the evaluation function.

2. The avoidance maneuver calculation device according to claim 1, wherein the evaluation function setting unit is further configured to:
set, as an avoidance time, a predicted time of accession of the automotive vehicle to a position of the obstacle, based on the evaluation starting time being and on a vehicle speed of the automotive vehicle at the evaluation starting time,
sets, as an evaluation ending time, the time after the automotive vehicle avoids and passes the obstacle and when a predicted avoidance maneuver is over, and
sets up the evaluation function to evaluate the vehicle condition in the predicted traveling loci in a period from the evaluation starting time to the evaluation ending time, wherein the evaluation of the vehicle condition is further based on a state of accession of the automotive vehicle to the obstacle, and a state of accession of the automotive vehicle to the boundary section of the road.

3. The avoidance maneuver calculation device according to claim 2, wherein
an output value of the evaluation function becomes smaller as a clearance between the obstacle and the automotive vehicle and a clearance between the boundary section and the automotive vehicle become greater, and also as a difference between the predicted attitude angle and the target attitude angle becomes smaller, and
the optimum maneuver amount calculator calculates the optimum maneuver amount for the automotive vehicle at the evaluation starting time.

4. The avoidance maneuver calculation device according to claim 3, wherein
the avoidance maneuver calculator comprises an obstacle movement locus prediction unit that predicts a movement locus of the obstacle, based on information on the obstacle detected by the obstacle detector, and
the evaluation function setting unit uses, as the state of accession of the automotive vehicle to the obstacle, a state of accession of the automotive vehicle to the obstacle, based on the movement locus of the obstacle predicted by the obstacle movement locus prediction unit.

5. The avoidance maneuver calculation device according to claim 3, wherein
the evaluation function comprises the state of attitude of the automotive vehicle, the state being determined by a target traveling position where the automotive vehicle reaches at the evaluation ending time and a predicted traveling position of the automotive vehicle at the evaluation ending time calculated by use of the predicted traveling locus, and
an output value of the evaluation function becomes smaller as a clearance between the target traveling position and the predicted traveling position becomes smaller.

6. The avoidance maneuver calculation device according to claim 5, further comprising:
a dividing line detector a lane dividing line drawn on the road on which the automotive vehicle is traveling, wherein
the avoidance maneuver calculator judges a lane on the road based on information on the lane dividing line from the dividing line detector,
the target traveling position is set on the lane on which the automotive vehicle is currently traveling, and
the target attitude angle is set up so as to orient the automotive vehicle in a direction to return to the lane on which the automotive vehicle is currently traveling.

7. The avoidance maneuver calculation device according to claim 5, further comprising:
a dividing line detector a lane dividing line drawn on the road on which the automotive vehicle is traveling, wherein:
the avoidance maneuver calculator judges a lane on the road based on information on the lane dividing line from the dividing line detector, the target traveling position is set on a lane parallel to the lane on which the automotive vehicle is currently traveling, and the target attitude angle is set up so as to orient the automotive vehicle to the parallel lane.

8. The avoidance maneuver calculation device according to claim 5, further comprising:

a track shape information acquisition unit that acquires track shape information on the road, wherein the attitude angle target value setting unit sets up the target attitude angle of the automotive vehicle so as to align the traveling direction of the automotive vehicle with a direction to a position on the road where the automotive vehicle reaches at the evaluation ending time calculated based on the speed of the automotive vehicle at the evaluation starting time.

9. The avoidance maneuver calculation device according to claim 2, wherein the avoidance maneuver calculator divides a time period from the evaluation starting time to the evaluation ending time into predetermined intervals and acquires the information detected by the road boundary detector, the obstacle detector, and the automotive vehicle information detector at each of the predetermined intervals, the evaluation function setting unit applies the detection information from the detectors to the evaluation function at each of the predetermined intervals, the attitude angle target value setting unit sets up the target attitude angle at each of the predetermined intervals, and the optimum maneuver amount calculator calculates an optimum driving maneuver amount for the automotive vehicle at each of the predetermined intervals.

10. The avoidance maneuver calculation device according to claim 3, wherein the evaluation function comprises a state of maneuver of a driving maneuver amount made for the automotive vehicle, and an output value of the evaluation function becomes smaller as the driving maneuver amount made for the automotive vehicle becomes smaller.

11. An avoidance control device comprising:

the avoidance maneuver calculation device according to claim 1; and a vehicle motion controller that performs a driving maneuver of the automotive vehicle by an optimum driving maneuver amount calculated by the avoidance maneuver calculation device.

12. The avoidance control device according to claim 11, wherein the vehicle motion controller controls an operation of at least one of a steering mechanism of the automotive vehicle and a braking mechanism of the automotive vehicle.

13. A vehicle comprising the avoidance maneuver calculation device according to claim 1.

14. A vehicle comprising the avoidance control device according to claim 11.

15. An avoidance maneuver calculating method comprising:

detecting, using a road boundary detector, a road located ahead of an automotive vehicle and on which the automotive vehicle is traveling, and a boundary section of the road;

detecting using an obstacle detector, an obstacle existing on the road ahead of the automotive vehicle;

detecting, using an automotive vehicle information detector, an attitude angle formed by a traveling direction of the automotive vehicle with respect to a direction of the road, a position of the automotive vehicle on the road, and a speed of the automotive vehicle; and calculating, using an avoidance maneuver calculator, an optimum maneuver amount for avoiding the obstacle on the road, based on the detection information, wherein the calculation of the optimum maneuver amount includes:

setting, as a target attitude angle, a target of an attitude angle at a time after the automotive vehicle avoids and passes the obstacle, wherein the target attitude angle is set according to a location on the road where the automotive vehicle is predicted to reach after the automotive vehicle avoids and passes the obstacle, setting up an evaluation function that evaluates a plurality of predicted traveling loci of the automotive vehicle corresponding to a plurality of possible maneuver amounts, the evaluation function evaluating a vehicle condition in the plurality of predicted traveling loci, wherein the evaluation of the vehicle condition is based at least on a state of attitude of the automotive vehicle calculated using (i) the target attitude angle, and (ii) a plurality of predicted attitude angles that are the attitude angles that the automotive vehicle on the plurality of predicted traveling loci is predicted to have at the time after the automotive vehicle avoids and passes the obstacle, and calculating the optimum maneuver amount based on a minimum value obtained from the evaluation function.

16. The avoidance maneuver calculating method according to claim 15, further comprising:

setting, as an evaluation starting time, a time of detection of the obstacle, setting, as an avoidance time, a predicted time of accession of the automotive vehicle to a position of the obstacle, based on the evaluation starting time and on a vehicle speed of the automotive vehicle at the evaluation starting time, setting, as an evaluation ending time, the time when a predicted avoidance maneuver is over, and setting up the evaluation function to evaluate the vehicle condition in the predicted traveling locus loci in a period from the evaluation starting time to the evaluation ending time, wherein the evaluation of the vehicle condition is further based on a state of accession of the automotive vehicle to the obstacle, and a state of accession of the automotive vehicle to the boundary section of the road.

17. The avoidance maneuver calculating method according to claim 16, wherein an output value of the evaluation function becomes smaller as a clearance between the obstacle and the automotive vehicle and a clearance between the boundary section and the automotive vehicle become greater, and also as a difference between the predicted attitude angle and the target attitude angle becomes smaller, and the step of calculating the optimum maneuver amount comprises calculating the optimum maneuver amount for the automotive vehicle at the evaluation starting time.

18. The avoidance maneuver calculating method according to claim 17, further comprising:

predicting a movement locus of the obstacle, based on information on the detected obstacle; and using, as the state of accession of the automotive vehicle to the obstacle, a state of accession of the automotive vehicle to the obstacle, based on the predicted movement locus of the obstacle.

19. The avoidance maneuver calculating method according to claim 17, wherein
the evaluation function comprises the state of attitude of the automotive vehicle, the state being determined by a target traveling position where the automotive vehicle reaches at the evaluation ending time and a predicted traveling position of the automotive vehicle at the evaluation ending time calculated by use of the predicted traveling locus, and
an output value of the evaluation function becomes smaller as a clearance between the target traveling position and the predicted traveling position becomes smaller.

20. The avoidance maneuver calculating method according to claim 19, further comprising:
detecting a lane dividing line drawn on the road on which the automotive vehicle is traveling;
judging a lane on the road based on information on the lane dividing line;
setting up the target traveling position on the lane on which the automotive vehicle is currently traveling; and
setting up the target attitude angle so as to orient the automotive vehicle in a direction to return to the lane on which the automotive vehicle is currently traveling.

21. The avoidance maneuver calculating method according to claim 19, further comprising:
detecting a lane dividing line drawn on the road on which the automotive vehicle is traveling;
judging a lane on the road based on information on the lane dividing line;
setting up the target traveling position on a lane parallel to the lane on which the automotive vehicle is currently traveling; and
setting up the target attitude angle so as to orient the automotive vehicle to the parallel lane.

22. The avoidance maneuver calculating method according to claim 19, further comprising:
acquiring track shape information on the road; and
setting up the target attitude angle of the automotive vehicle so as to align the traveling direction of the automotive vehicle with a direction to a position on the road where the automotive vehicle reaches at the evaluation ending time calculated based on the speed of the automotive vehicle at the evaluation starting time.

23. The avoidance maneuver calculating method according to claim 16, further comprising:
dividing a time period from the evaluation starting time to the evaluation ending time into predetermined intervals and acquiring the detection information at each of the predetermined intervals;
applying the detection information to the evaluation function at each of the predetermined intervals,
setting up the target attitude angle at each of the predetermined intervals; and
calculating an optimum driving maneuver amount for the automotive vehicle at each of the predetermined intervals.

24. The avoidance maneuver calculating method according to claim 17, wherein
the evaluation function comprises a state of maneuver of a driving maneuver amount made for the automotive vehicle, and
an output value of the evaluation function becomes smaller as the driving maneuver amount made for the automotive vehicle becomes smaller.

25. An avoidance controlling method comprising:
performing driving maneuver of the automotive vehicle by an optimum driving maneuver amount calculated by the avoidance maneuver calculating method according to claim 15.

26. The avoidance controlling method according to claim 25, comprising:
controlling an operation of at least one of a steering mechanism of the automotive vehicle and a braking mechanism of the automotive vehicle.

27. An avoidance maneuver calculation device comprising:
road boundary detecting means for detecting a road located ahead of an automotive vehicle and on which the automotive vehicle is traveling and a boundary section of the road;
obstacle detecting means for detecting an obstacle existing on the road ahead of the automotive vehicle;
automotive vehicle information detecting means for detecting an attitude angle formed by a traveling direction of the automotive vehicle with respect to a direction of the road, a position of the automotive vehicle on the road, and a speed of the automotive vehicle; and
avoidance maneuver calculating means for calculating an optimum maneuver amount for avoiding the obstacle on the road, based on information from the detecting means, wherein the avoidance maneuver calculating means comprises:
attitude angle target value setting unit for setting, as a target attitude angle, a target of an attitude angle at a time after the automotive vehicle avoids and passes the obstacle, wherein the target attitude angle is set according to a location on the road where the automotive vehicle is predicted to reach after the automotive vehicle avoids and passes the obstacle,
evaluation function setting unit for setting up an evaluation function that evaluates a plurality of predicted traveling loci of the automotive vehicle corresponding to a plurality of possible maneuver amounts, the evaluation function evaluating a vehicle condition in the plurality of predicted traveling loci, wherein the evaluation of the vehicle condition is based at least on a state of attitude of the automotive vehicle calculated using (i) the target attitude angle, and (ii) a plurality of predicted attitude angles that are the attitude angles that the automotive vehicle on the plurality of predicted traveling loci is predicted to have at the time after the automotive vehicle avoids and passes the obstacle, and
optimum maneuver amount calculating means for calculating the optimum maneuver amount for avoiding the obstacle based on a minimum value obtained from the evaluation function.

* * * * *